United States Patent
Bramlett et al.

(10) Patent No.: US 11,335,026 B1
(45) Date of Patent: May 17, 2022

(54) DETECTING TARGET OBJECTS IN A 3D SPACE

(71) Applicant: Science Applications International Corporation, Reston, VA (US)

(72) Inventors: Stephen Eric Bramlett, Gurley, AL (US); Michael Harris Rodgers, Huntsville, AL (US)

(73) Assignee: Science Applications International Corporation, Reston, VA (US)

( * ) Notice: Subject to any disclaimer, the term of this patent is extended or adjusted under 35 U.S.C. 154(b) by 158 days.

(21) Appl. No.: 16/779,917

(22) Filed: Feb. 3, 2020

(51) Int. Cl.
| | |
|---|---|
| *G06T 7/70* | (2017.01) |
| *G06T 7/73* | (2017.01) |
| *G06T 3/40* | (2006.01) |
| *G06T 7/33* | (2017.01) |
| *G06K 9/62* | (2022.01) |
| *G06K 9/32* | (2006.01) |
| *G06K 9/46* | (2006.01) |
| *G06T 7/80* | (2017.01) |
| *G06T 7/246* | (2017.01) |

(52) U.S. Cl.
CPC ............. *G06T 7/74* (2017.01); *G06K 9/3233* (2013.01); *G06K 9/3241* (2013.01); *G06K 9/4671* (2013.01); *G06K 9/6202* (2013.01); *G06T 3/4038* (2013.01); *G06T 7/246* (2017.01); *G06T 7/33* (2017.01); *G06T 7/80* (2017.01); *G06T 2207/10016* (2013.01); *G06T 2207/20021* (2013.01); *G06T 2207/30244* (2013.01)

(58) Field of Classification Search
CPC .......... G06T 7/74; G06T 7/33; G06T 3/4038; G06T 7/246; G06T 7/80; G06T 2207/10016; G06T 2207/30244; G06T 2207/20021; G06K 9/4671; G06K 9/6202; G06K 9/3241; G06K 9/3233
See application file for complete search history.

(56) References Cited

U.S. PATENT DOCUMENTS

| | | | |
|---|---|---|---|
| 7,558,762 | B2 | 7/2009 | Owechko et al. |
| 8,995,712 | B2 | 3/2015 | Huang et al. |
| 2014/0347475 | A1 | 11/2014 | Divakaran et al. |
| 2018/0012461 | A1 | 1/2018 | Hill et al. |

(Continued)

FOREIGN PATENT DOCUMENTS

GB 2546140 B 10/2019

OTHER PUBLICATIONS

"Algorithms—Finding the Intersection Point of Many Lines in 3D (point closest to all lines)", Mathematics, printed Dec. 29, 2019, from <https://math.stackexchange.com/questions/61719/finding-the-intersection-point-of-many-lines-in-3d-point-closest-to-all-lines>, 3 pages.

Chapters, Image Filtering, downloaded Dec. 28, 2019, from <https://cecas.clemson.edu/-stb/ece847/internal/cvbook/ch03_filtering.pdf>, pp. 45-63.

(Continued)

*Primary Examiner* — Qian Yang
(74) *Attorney, Agent, or Firm* — Banner & Witcoff, Ltd.

(57) ABSTRACT

Search points in a search space may be projected onto images from cameras imaging different parts of the search space. Subimages, corresponding to the projected search points, may be selected and processed to determine if a target object has been detected. Based on subimages in which target objects are detected, as well as orientation data from cameras capturing images from which the subimages were selected, positions of the target objects in the search space may be determined.

36 Claims, 20 Drawing Sheets

(56) References Cited

U.S. PATENT DOCUMENTS

2020/0380726 A1* 12/2020 Graefling .............. G06T 7/0002
2020/0382694 A1* 12/2020 Dutton ................... G01S 17/86

OTHER PUBLICATIONS

Zawaideh, et al., "Comparison Between Butterworth and Gaussian High-Pass Filters Using an Enhanced Method," IJCSNS International Journal of Computer Science and Network Security, vol. 17, No. 7, Jul. 2017, pp. 113-117.
Rosa, et al., "Performing Edge Detection by Difference of Gaussians Using q-Gaussian Kernels," Journal of Physics Conference Series—Nov. 2013, pp. 1-5.
The Trifocal Tensor, downloaded Dec. 15, 2019, from <https://www.robots.ox.ac.uk/-vgg/hzbook/hzbook2/HZtrifocal.pdf>, p. 365-390.
Pan/Tilt Positioners for PIZ Cameras, Antennas and Other Positioning Applications, printed Dec. 18, 2019, from <https://www.2bsecurity.com/categories/pan-tilt-units/>, 4 pages.
Shashua, "Trilinear Tensor: The Fundamental Construct of Multiple-View Geometry and its Applications," Institute of Computer Science, downloaded Dec. 15, 2019, from <http://citeseerx.ist.psu.edu/viewdoc/download?doi=10.1.1.56.8462&rep=rep1&type=pdf>, 17 pages.
"General Formula for Where Shortest Distance Between 2 Skew Lines Intersects," printed Dec. 29, 2019, from <https://math.stackexchange.com/questions/2827129/general-formula-for-where-shortest-distance-between-2-skew-lines-intersects>, 2 pages.
Avidan, et al., "Novel View Synthesis in Tensor Space*", Institute of Computer Science, downloaded Dec. 15, 2019, from <http://www.eng.tau.ac.il/-avidan/papers/view-syn-cvpr97.pdf>, 7 pages.

* cited by examiner

DETECTING TARGET OBJECTS IN A 3D SPACE

GOVERNMENT LICENSE RIGHTS

This invention was made with Government support under Contract No. GS00Q14OADU329 awarded by the United States Air Force. The Government has certain rights in this invention.

BACKGROUND

Unmanned aerial vehicles (UAVs), also known as drones, are widely used. Detecting UAVs can be a challenging problem. Although radar is a useful tool, some radars may struggle to detect objects, such as some UAVs, that may be relatively slow-moving and that have small radar cross-sections. Moreover, radar may lack the spatial resolution to satisfactorily detect and track large numbers of UAVs.

SUMMARY

This Summary is provided to introduce a selection of some concepts in a simplified form as a prelude to the Detailed Description. This Summary is not intended to identify key or essential features.

Multiple cameras may be arranged in and/or around a search space. Some or all of the cameras may continuously pan and/or tilt to move fields of view of those cameras to image different portions of the search space. A plurality of search points in the search space may be selected. Based on orientation data for the cameras, positions of at least some of the search points may be projected onto images captured by at least a portion of the cameras. Subimages, corresponding to the projected search point positions, may be selected and processed to determine if a target object has been detected. Based on subimages with which target objects are detected, as well as orientation data from cameras capturing images from which the subimages were selected, positions of the target objects in the search space may be determined. The search point positions may be randomly selected and/or may change over time (e.g., each search cycle). If a target object is detected, a portion of the search points may be assigned to the target object and positioned based on a position of the target object.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Arrays of cameras may be used to distinguish, detect, and/or track target objects such as small UAVs. Data from multiple cameras capturing images of a target object may be used to determine an XYZ position of the target object in a search space. Unlike many radars, which may have errors of 1 to 2 degrees when determining azimuth or elevation of a detected object, a camera may have an angular resolution on the order of 0.01 degrees. Although a single camera may be less able to determine range than radar, range may be determined if at least 2 cameras capture images of a target object.

Figure 1:
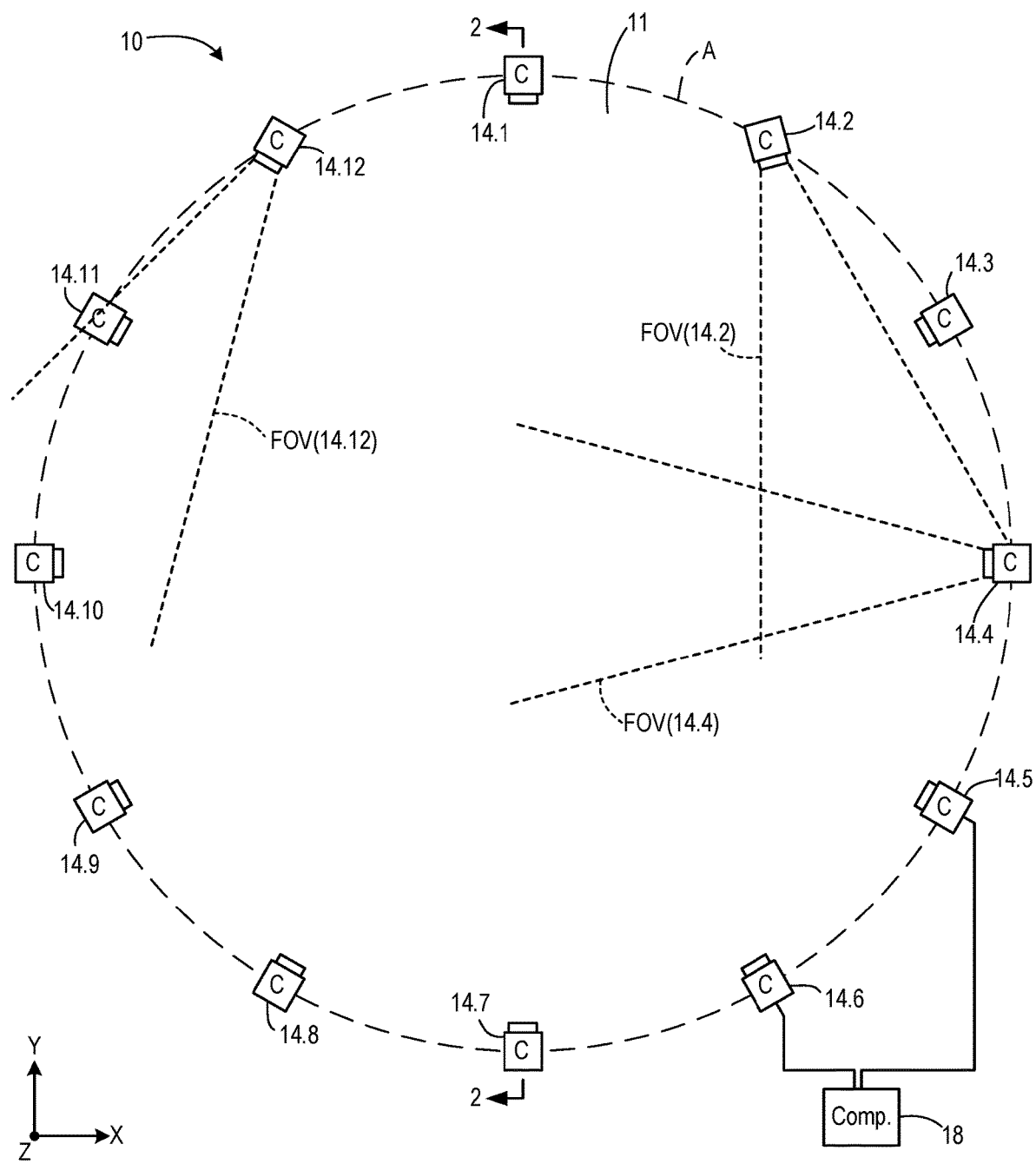
FIG. 1 is a partially schematic plan view of a system for detecting target objects.

FIG. 1 is a partially schematic plan view of a system 10 configured to detect target objects (e.g., UAVs) that may enter a search space 11. The search space 11 may cover an area A extending across a horizontal plane corresponding to the X and Y axes shown in FIG. 1. The Z axis shown in FIG. 1 axis may correspond to a vertical axis and may, in combination with the X, Y, or other horizontal axis, define one or more vertical planes. The search space 11 may, as explained in more detail below, extend vertically over the area A. A facility (e.g., a military base or camp) be located in the area A, and it may be desirable to protect the facility from UAVs. The system 10, upon detecting a UAV or other target object in the search space 11, may output information (e.g., coordinates defining a location of the target object) to one or more other systems so that the target object may be tracked and/or otherwise acted upon (e.g., shot down).

The system 10 may comprise a plurality of cameras ("C"). In the example of FIG. 1, the system 10 comprises 12 cameras 14.1 through 14.12. For convenience, the cameras 14.1 through 14.12 may be referred to collectively as the cameras 14 and/or generically as the (or a) camera 14. The cameras 14 may be equally spaced around a circular boundary of the area A. However, this is not required. In other example configurations, the cameras 14 may not be equally distributed, some or all of the cameras 14 may be displaced inward or outward from a boundary of an area covered by a search space, and/or there may be more or fewer cameras 14. An area covered by a search space need not be circular, and may have any regular or irregular shape.

Each of the cameras 14 may have a field of view (FOV). The FOV of a camera 14 may be a frustoconical or frustopyramidal spatial region, extending from the camera 14, that can be imaged by an image sensor of the camera 14. The orientation of an FOV of a camera 14 may change as that camera 14 is moved. To avoid confusing FIG. 1 with unneeded details, FOV lines are only included for the cameras 14.2, 14.4, and 14.12. The lengths of lines used to indicate FOVs in the drawings are not intended to indicate depths associated with FOVs. The widths, depths, and shapes of the FOVs of the cameras 14 may all be the same, or one or more of the cameras 14 may have an FOV having a width, depth, and/or shape different from that of the FOV(s) of one or more other cameras 14.

Each of the cameras 14 may pan by rotating about a first (e.g., a vertical) axis. Each of the cameras 14 may also tilt by rotating about a second (e.g., a horizontal axis). For example, the camera 14.12 is shown panned toward the camera 14.11 and the camera 14.2 is shown panned toward the camera 14.3. Additional details of the cameras 14 are described below in connection with FIGS. 3A through 3E. Each of the cameras 14 may be configured to continuously pan back and forth and/or continuously tilt up and down so as to capture images of all or substantially all of the search space 11 during the course of one or more search cycles. The pan and/or tilt of each camera may be random, regular (e.g., periodic), and/or otherwise controlled.

An area associated with a search space may be tens, hundreds, or thousands of meters across. For example, a distance D separating cameras on opposite sides of the area A (e.g., the cameras 14.1 and 14.7) may be 50 meters, 100 meters, 500 meters, 1000 meters, 1500 meters, or another value. A size of an area such as area A may similarly have a wide range of values. For example, the area A may have a size of at least 2000 square meters ($m^2$), at least 8000 $m^2$, at least 200,000 $m^2$, at least 500,000 $m^2$, at least 785,000 $m^2$, at least 1,767,000 $m^2$, or another value.

Each of the cameras 14 may be in communication with one or more computers 18. Although FIG. 1 only shows communication paths between the computer 18 and the camera 14.5 and between the computer 18 and the camera 14.6, similar communication paths may extend between the computer 18 and each of the cameras 14. The communication paths may be wired and/or wireless. The computer 18 and the cameras 14 may be nodes of a network. Data that may be transmitted from a camera 14 to the computer 18 via one of the communication paths may comprise image data for an image captured by the camera 14, values for pan and tilt of the camera 14 at the time of an image capture, metadata (e.g., time/date) for a for a captured image, status and/or error reports for the camera, etc. Data that may be transmitted to a camera 14 may comprise a pan instruction, a tilt instruction, an instruction to capture an image, an instruction to provide image data, an instruction to provide pan and/or tilt values, and/or other information. The computer 18 may also provide data in the form of programming instructions to a camera 14. For example, each camera 14 may comprise a separate control device that executes programming instructions to control pan and/or tilt actuators, to control zoom-in and/or zoom-out, to control aperture opening, and/or to control other operations of the camera 14. Those programming instructions, and/or updates or modifications thereto, may be downloaded to a camera 14 by the computer 18.

Figure 2:
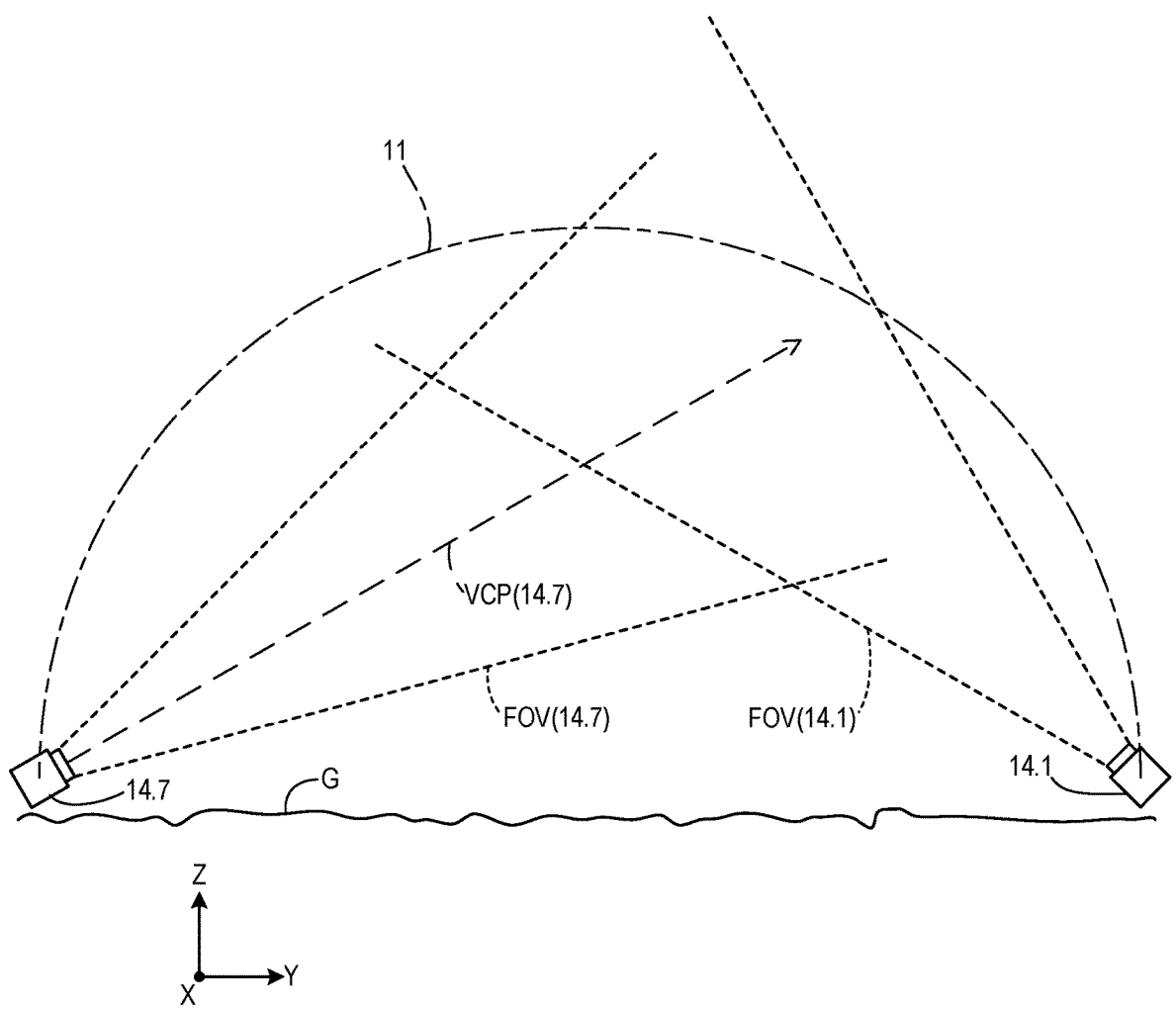
FIG. 2 is a partially schematic elevational view of the system of FIG. 1.

FIG. 2 is a partially schematic elevational view, from the location indicated in FIG. 1, of the system 10. The X, Y, and Z axes shown in FIG. 2 are the same as those shown in FIG. 1. For convenience, only the cameras 14.1 and 14.7 are included in FIG. 2, but the other cameras 14 may have heights above the ground surface G similar to those of the cameras 14.1 and 14.7. The cameras 14.1 and 14.7 are both tilted upward. Also shown in FIG. 2 is a ground surface G. The search space 11 is shown in FIG. 2 as a hemispherical region above the ground surface G. However, the shape of a search space need not be hemispherical and may have any shape. Also shown in FIG. 2 is a center pixel vector VCP (14.7) associated with the camera 14.7. Center pixel vectors are further described below.

Figure 3A:
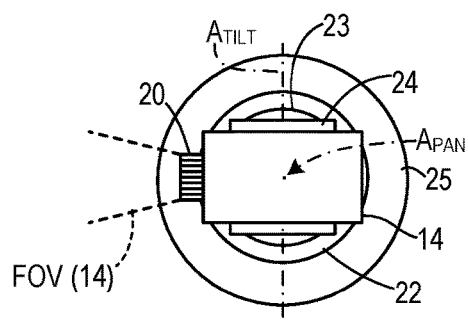
FIGS. 3A, 3B, and 3C are respective top, side, and front views of an example camera and pan/tilt mount attached to a pole.
Figure 3B:
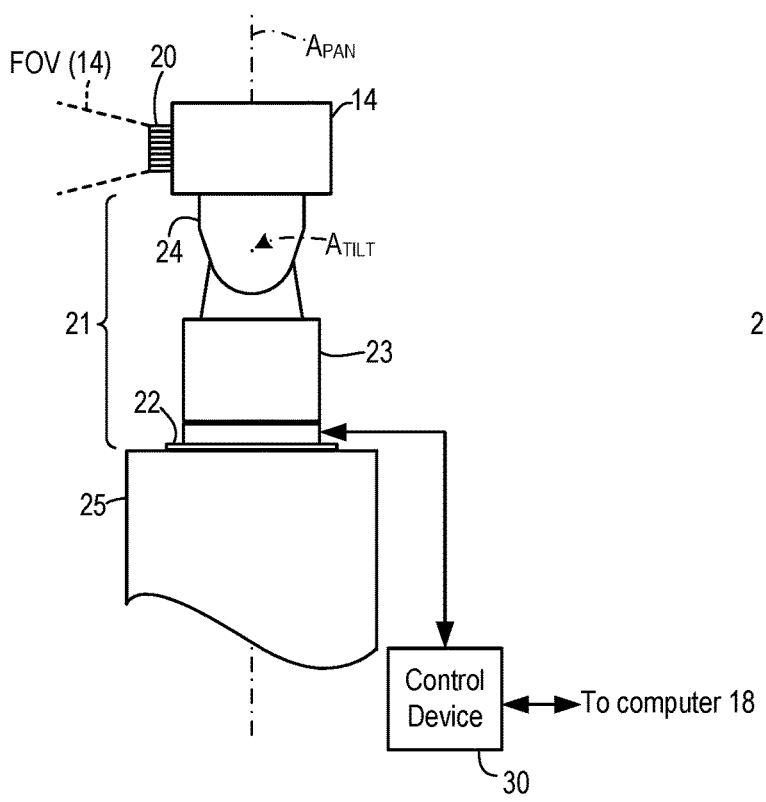
Figure 3C:
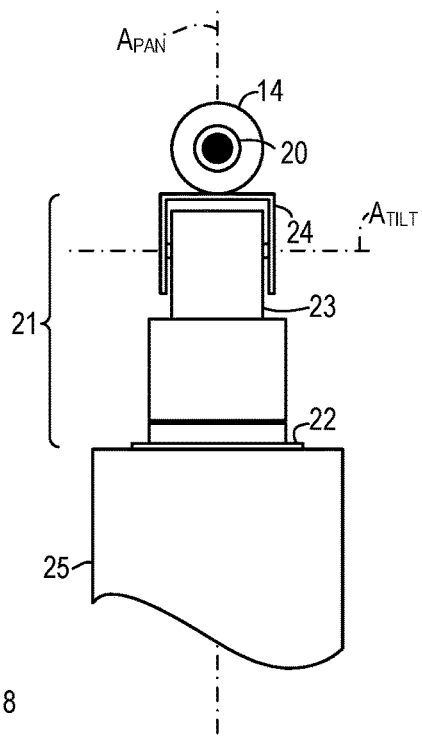

FIG. 3A is a partially schematic top view showing an example camera 14 mounted for use in the system 100. FIGS. 3B and 3C are partially schematic side and front views, respectively, of the mounted example camera 14. The camera 14 may comprise a lens/aperture assembly 20. The lens/aperture assembly 20 may be adjustable to control a width and/or height of the FOV, and/or depth of the FOV (e.g., a zoom). The lens/aperture assembly may be controlled by a servo or other actuator, not shown, that can be controlled remotely (e.g., by the computer 18). The camera 14 may attached to a pan/tilt mount 21, and the mount 21 may be attached to a post 25 or other support. The mount 21 may include a base 22, a main body 23, and a camera mounting bracket 24. The main body 23 may be rotatably coupled to the base 22 and configured to rotate about a pan axis $A_{PAN}$. The bracket 24 may be rotatably coupled to the main body 23 and configured to rotate about a tilt axis $A_{TILT}$. The tilt axis $A_{TILT}$, which may pass through the center of a pivotal coupling between the bracket 24 and the main body 23, may be orthogonal to, but rotatable about, the pan axis $A_{PAN}$. Main body 23 may contain actuators (e.g., stepper motors, servos, and/or other mechanical actuators) to rotate the main body 23 relative to the base 24, and to rotate the bracket 24 relative to the main body 23, in response to input control signals. The mount 21 may further comprise pan and tilt encoders. The pan encoder may output signals indicative of the pan angle (e.g., an angle relative to true North or other calibration reference) of the mount 21. The tilt encoder may output signals indicative of the tilt angle (e.g., an angle relative to a horizontal plane or other calibration reference) of the mount 21. Pan/tilt camera mounts, including pan/tilt camera mounts with built-in pan and tilt encoders, are commercially-available components.

Figure 3D:
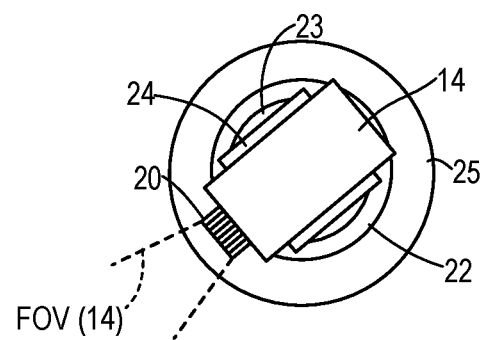
FIG. 3D is a top view of the example camera, pan/tilt mount, and pole of FIGS. 3A through 3C and showing the camera panned relative to the orientation shown in FIG. 3A.
Figure 3E:
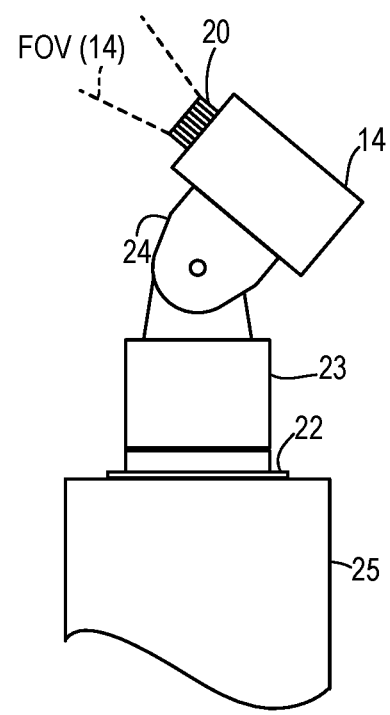
FIG. 3E is a side view of the example camera, pan/tilt mount, and pole of FIGS. 3A through 3C and showing the camera tilted relative to the orientation shown in FIG. 3B.

FIG. 3D is a top view of the example camera 14 similar to FIG. 3A, but showing the mount 21 and the camera 14 panned relative to the orientation shown in FIG. 3A. FIG. 3E is a side view of the example camera 14 similar to FIG. 3B, but showing the mount 21 and the camera 14 tilted relative to the orientation shown in FIG. 3B. Although FIG. 3D only shows panning relative to FIG. 3A and FIG. 3E only shows tilting relative to FIG. 3B, this is only for convenience in the drawings. The mount 21, with the mounted camera 14, may simultaneously pan and tilt.

Each combination of a camera 14 and a mount 21 may comprise a dedicated control device 30, which for convenience is only shown in FIG. 3B. The control device 30 may comprise a computing device configured to execute instructions to control operations of the camera 14 and/or of the mount 21. For example, the control device 30 may execute instructions (e.g., previous provided by the computer 18) that cause the control device 30 to output control signals to the mount 21 so as to control pan and tilt movements. As another example, the control device 30 may execute instructions to perform processing of images captured by the camera 14. The control device 30 may also store images captured by the camera 14. Such processing may comprise, for example, use of one or more known algorithms to correct lens distortion. The control device 30 may communicate (e.g., via a network) with the computer 18. Instead of, or in addition to, a single camera 14/mount 21 combination comprising a dedicated control device 30, a single control device 30 may control and/or perform processing for multiple camera 14/mount 21 combinations. Also or alternatively, a control device 30 may be omitted and all control and processing performed by the computer 18

Each camera 14 may comprise an image sensor, e.g., an imaging element such as a charged-coupled device (CCD) or a complimentary metal oxide semiconductor (CMOS). The image sensor may comprise pixels arranged in a known pattern. For example, an image sensor may comprise an array of pixels arranged in columns and rows (e.g., an 1920 column by 1280 row array). The pixels of the image sensor may correspond to positions in an image captured by a camera with that image sensor. A center pixel of an image sensor array, or a group of center pixels, may be determined and may represent an end point of a center pixel vector such as the center pixel vector VCP (14.7) shown in FIG. 2. If the spatial position (e.g., XYZ coordinates), pan angle, and tilt angle of a camera 14 are known (e.g., based on calibration such as described below), the location and orientation of a center pixel vector may be determined for that camera 14. Other pixels of the image sensor for that camera may also correspond to separate vectors, and the relation between those other vectors and the center pixel vector may be determined (e.g., during calibration).

Based on vectors from camera pixels, a location of a target object in the search space 11 may be determined. For example, a first camera 14 may capture a first image comprising a target object image in a portion of the first image. As used herein, a target object image may refer to a portion of an image (or to a portion of a subimage) that shows and/or otherwise represents a target object in the FOV of a camera that captured the image. Based on a determination of which pixels of the first camera 14 imaging element are centered on the target object image, based on the position of the first camera 14, and based on the pan and tilt angles of the first camera 14 when the first image is captured, a first vector may be determined. That first vector may extend from the first camera 14, through the target object, and into the search space 11. A second camera 14 may simultaneously capture a second image showing the target object in a portion of the second image. Based on a determination of which pixels of the second camera 14 imaging element are centered on the target object, based on the position of the second camera 14, and based on the pan and tilt angles of the second camera 14 when the second image is captured, a second vector may be determined. That second vector may extend from the second camera 14, through the target object, and into the search space 11. This may be repeated for additional cameras 14 simultaneously capturing additional images of the target object. Based on the determined vectors, a position of the target object in the search space 11 may be determined.

The system 10 may be calibrated for use in detection of target objects in the search space 11. The calibration may comprise, for each of the cameras 14, determining the camera position relative to the search space 11. The location of each camera may be described in XYZ coordinates relative to fixed point in or near the search space 11, or may be defined using one or more other coordinate conventions. To determine the locations of the cameras 14, stakes with fiducial markings may be placed in numerous locations throughout the area A. Using LIDAR and/or other known mapping technology, the distances between the stakes, and relative directions between the stakes, may be determined. With this information, the XYZ locations of the stakes in a local coordinate system for the search space 11 may be determined. After each of the cameras 14 is installed (e.g., after each of the cameras 14 is attached to a mount 21 and the mount 21 is attached on a pole 25 or other support), each camera may be panned and/or tilted so that, for each of the calibration stakes, a calibration image and related data (e.g., values for pan and tilt angles at image capture) are collected.

Figure 4A:
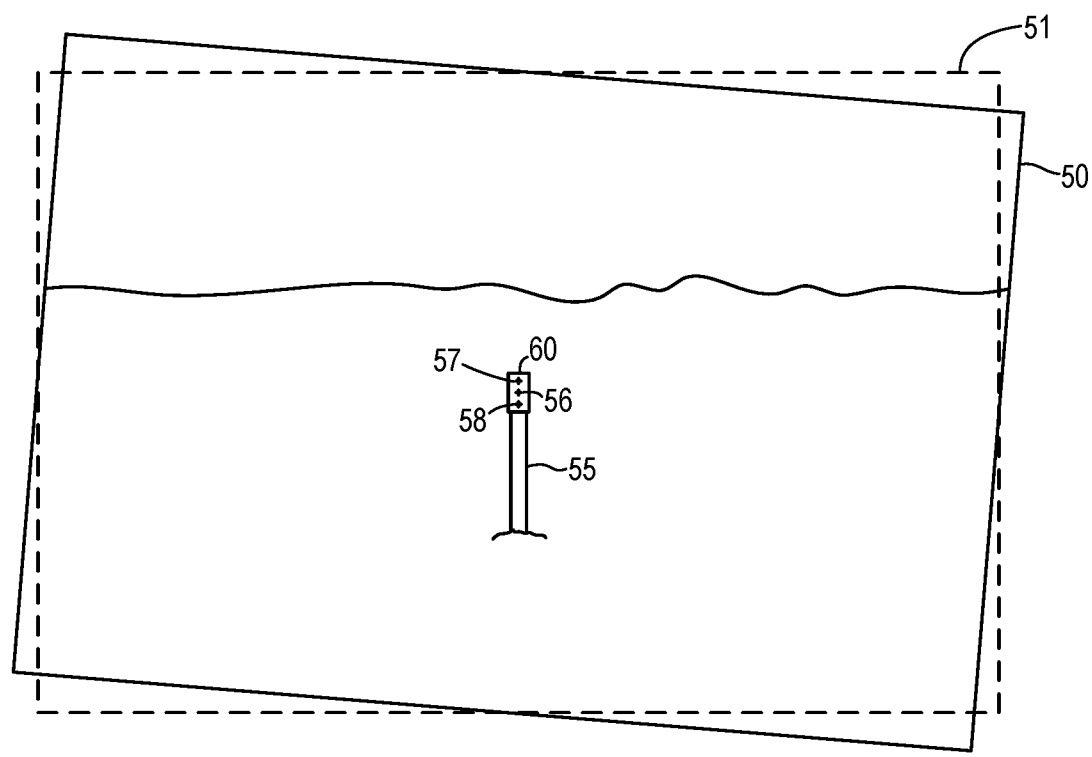
FIG. 4A shows an example calibration image.

FIG. 4A shows an example calibration image 50. The image 50 shows a calibration stake 55 comprising a plate 60 with a center fiducial mark 56, a top fiducial mark 57, and a bottom fiducial mark 58. At the time the stake 55 is placed, the plate 60 may be adjusted so that the fiducial marks 56, 57, and 58 have a known orientation (e.g., vertical). To capture the image 50, the camera 14 may be panned and tilted until an image of the center fiducial mark 56 is near a center pixel of the camera's image sensor. The camera 14 capturing the image 50 may be imperfectly aligned. In particular, rows of the camera 14 pixels may be at a slight angle to a reference horizontal plane (e.g., the XY plane of the XYZ axes shown in FIGS. 1 and 2) of the search space 11, and columns of the camera 14 pixels are at a slight angle to reference vertical axis (e.g., the Z axis shown in FIGS. 1 and 2) of the search space 11. This is indicated in FIG. 4A by the broken line 51, which shows the boundaries the image 50 may have if the camera 14 capturing the image 50 was perfectly aligned.

Figure 4B:
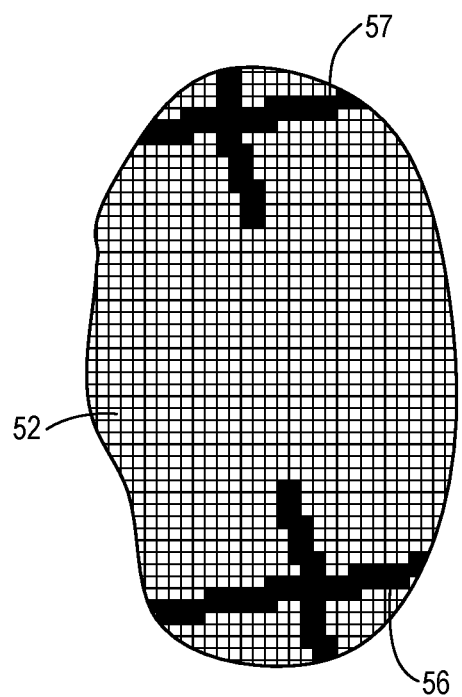
FIG. 4B shows a portion of the example calibration image of FIG. 4A.

FIG. 4B shows a portion of the image 50 containing images of portions of the fiducial marks 57 and 58. Blocks of the grid in FIG. 4B represent individual pixels. For convenience, the sizes of the individual pixels 52 in the image 50, as well as the sizes of pixels shown in other drawings figures, may be exaggerated. In FIG. 4B, the rows of the camera 14 pixels 52 capturing the image 50 are arranged horizontally on the page, and columns of those pixels 52 are arranged vertically on the page. Based on a known actual distance between the fiducial marks 57 and 58, a known actual orientation of the fiducial marks 57 and 58 in the search space 11, and a measured distance to the plate 60 from the camera 14 that captured the image 50, relationships between vectors respectively originating at each of the pixels 52 may be determined for the camera that captured the image 50.

The locations of each of the cameras 14 may be determined based on pan and tilt angles corresponding to captured calibration images, and based on the relationships determined, for each of the cameras 14, between pixels and vectors originating at those pixels. For example, based on a first calibration image of a first stake 55 captured by a first camera 14, and based on pan and tilt angles corresponding to the first calibration image, pan and tilt angles corresponding to alignment of the first camera 14 center pixel with the center fiducial point 56 of that first stake 55 may be determined. Based on a second calibration image of a second stake 55 captured by the first camera 14, and based on pan and tilt angles corresponding to the second calibration image, pan and tilt angles corresponding to alignment of the first camera 14 center pixel with the center fiducial point 56 of that second stake 55 may be determined. A difference between the pan angles for the first and second calibration images, a difference between the tilt angles for the first and second images, and the known locations of the first and second stakes 55 may be used to determine a location of the first camera 14 relative to the search space 11, as well as respective relationships between pan and tilt angles of the first camera and a reference direction (e.g., true North) and a reference plane (e.g., a horizontal plane). Additional calibration images, captured by the first camera 14 of additional stakes 55, may similarly be used, with known locations of those additional stakes 55, to obtain additional precision and/or accuracy for values of the location, of the relation between pan angle and the reference direction, and of the relation between the tilt angle and the reference plane. Similar calibration may be performed for additional cameras 14.

Figure 5A:
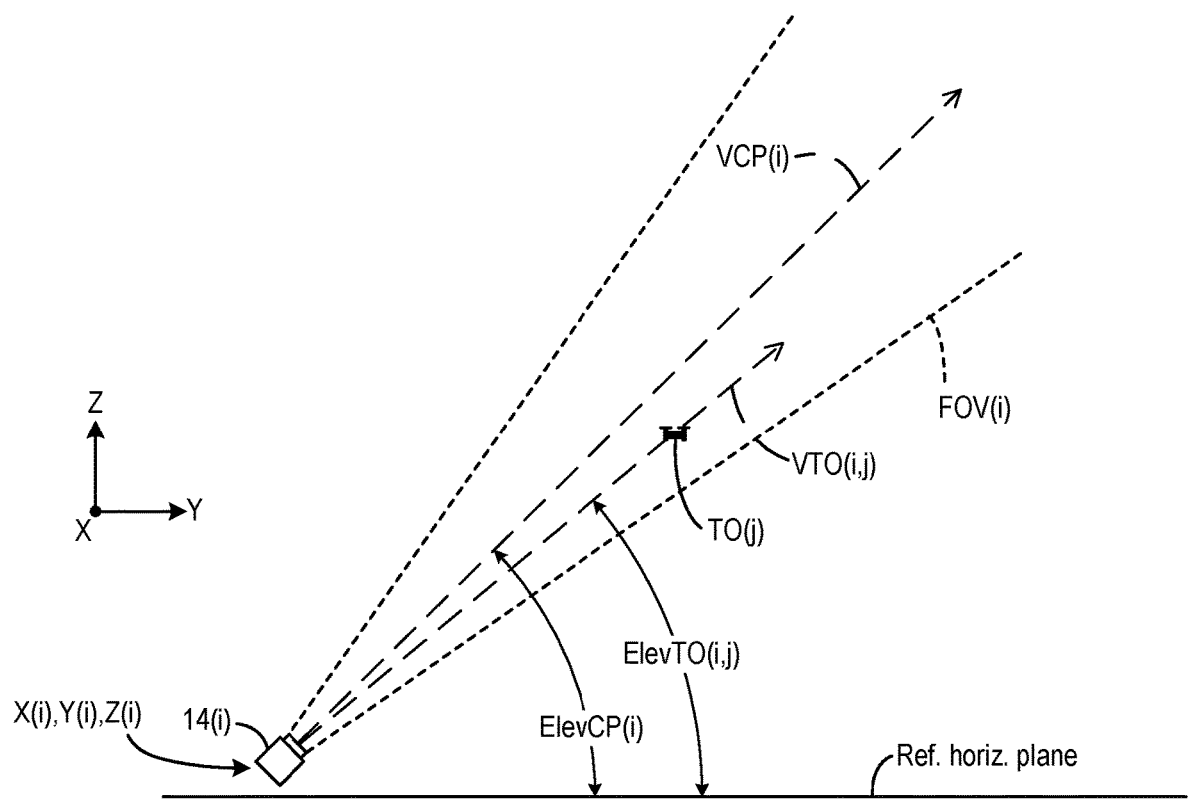
FIG. 5A is a partially schematic elevational view of an example camera at a time of capturing an image of an example target object.
Figure 5B:
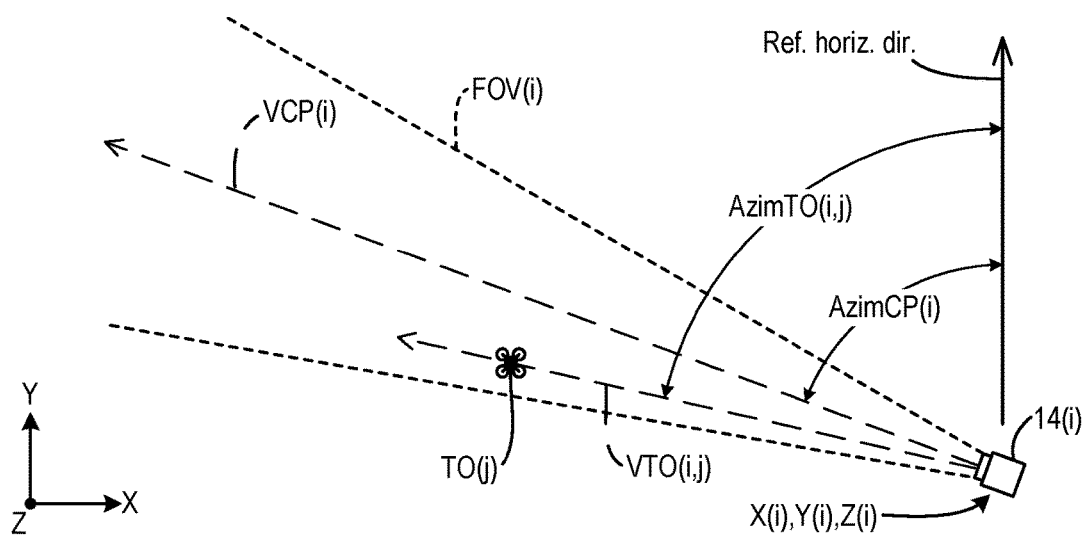
FIG. 5B is a partially schematic plan view of the example camera of FIG. 5A at the time of capturing the image of the example target object.
Figure 5C:
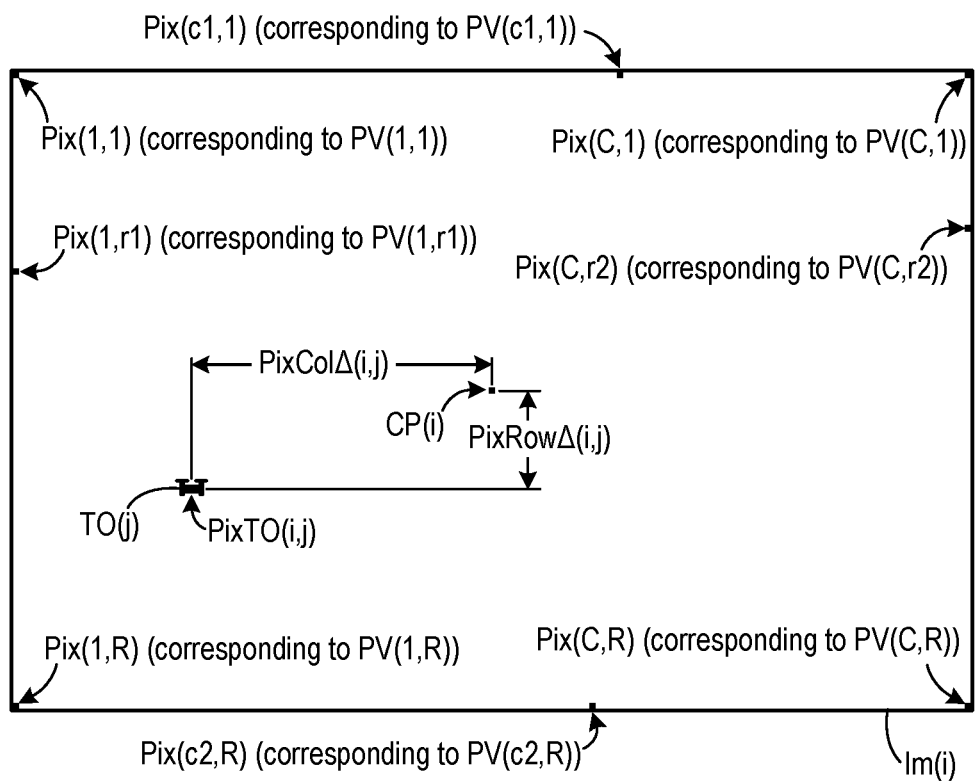
FIG. 5C is a partially schematic view of an example image captured by a camera at the time corresponding to FIGS. 5A and 5B.

FIG. 5A is a partially schematic elevational view of an example camera 14($i$), at a time of capturing an image of an example target object TO(j), and showing examples of physical quantities represented by various data items described below. In connection with the drawings and description herein, "i" may be a counter variable corresponding to an $i^{th}$ camera 14, with i having a value between 1 and N. In the example of FIGS. 1 and 2, N=12. Similarly, "j" may be a counter variable corresponding to a $j^{th}$ target object image within a single image, and may have an integer value of zero or greater. Although examples of FIGS. 5A through 5C show a single target object TO(j) in the FOV of a camera 14($i$), multiple target objects may be present in a camera FOV and may correspond to multiple target object images in a captured image. FIG. 5B is a partially schematic plan view of the camera 14($i$), at the time of capturing the image of the target object TO(j), and showing additional examples of physical quantities represented by various data items described below. FIG. 5C is a partially schematic view of an example image Im(i), captured by the camera 14($i$) at the time corresponding to FIGS. 5A and 5B, and showing further examples of physical quantities represented by various data items described below. The pixels at the edges and center of the image Im(i) are blacked out in FIG. 5C for purposes of explanation.

Based on calibration, the computer 18 may store, for each of N cameras 14 in a system such as the system 10, data such as that summarized in Table 1 and described in further detail after Table 1.

TABLE 1

| Data Element | Description |
|---|---|
| X(i), Y(i), Z(i) | Coordinates for location of camera 14(i) |
| CP_Pan_Offset(i) | Offset to pan angle for camera 14(i) to obtain AzimCP(i) (azimuth of VCP(i)) |
| CP_Tilt_Offset(i) | Offset to tilt angle for camera 14(i) to obtain ElevCP(i) (elevation of VCP(i)) |
| F1[PixColΔ(i,j), PixRowΔ(i,j), ElevCP(i)] | Function to obtain ElevTO(i,j) (target object j elevation) based on PixColΔ(i,j) (no. of pixel columns from center pixel of camera 14(i) to center pixel of target object j in image Im(i)), PixRowΔ(i,j) (no. of pixel columns from center pixel of camera 14(i) to center pixel of target object j in Im(i)), and ElevCP(i) |

TABLE 1-continued

| Data Element | Description |
|---|---|
| F2[PixColΔ(i,j), PixRowΔ(i,j), AzimCP(i)] | Function to obtain AzimTO(i,j) (target object j azimuth) based on PixColΔ(i,j), PixRowΔ(i,j), and AzimCP(i) |
| PV(c,r)[PixColΔ(c,r), PixRowΔ(c,r), AzimCP(i)] | Function to obtain pixel vector PV(c,r) corresponding to pixel c,r (pixel in column c, row r), based on PixColΔ(c,r) (no. of pixel columns from center pixel of camera 14(i) to column c), PixRowΔ(c,r) (no. of pixel rows from center pixel of camera 14(i) to row r), and AzimCP(i) |

The values X(i), Y(i), and Z(i) may be coordinates, in a coordinate system associated with the search space 11, of the location of the camera 14($i$). The data element CP_Pan_Offset(i) may be an offset value that may be added to a pan angle, associated with an image Im(i) captured by the camera 14($i$), to determine the value AzimCP(i). The value AzimCP(i) may be a value for an azimuth angle, relative to a reference horizontal direction, of the vector VCP(i) corresponding to the center pixel of the camera 14($i$) at the time the image Im(i) is captured. The data element CP_Tilt_Offset(i) may be an offset value that may be added to a tilt angle, associated with the image Im(i), to determine the value ElevCP(i). The value ElevCP(i) may be a value for an elevation angle, relative to a reference horizontal plane, of the vector VCP(i) corresponding to the center pixel of the camera 14($i$) at the time the image Im(i) is captured.

The data element F1 [PixColΔ(i,j), PixRowΔ(i,j), ElevCP(i)] may be a function that, based on input elements PixColΔ(i,j), PixRowΔ(i,j), ElevCP(i), outputs a value for ElevTO(i,j). The output value ElevTO(i,j) may be an elevation angle, relative to the reference plane, of a vector VTO(i,j). The vector VTO(i,j) may be a vector that corresponds to a pixel in the center of a target object image of $j^{th}$ target object TO(j) in the image IM(i). The input value ElevCP(i) is described above. Examples of the input values PixColΔ(i,j) and PixRowΔ(i,j) are shown in FIG. 5C, which shows the image Im(i) captured by the camera 14($i$) in FIGS. 5A and 5B. The value PixColΔ(i,j) may be a quantity of pixel columns separating a center pixel CP(i) for the camera 14($i$) and a pixel PixTO(i,j) corresponding to a centroid of the target object image of the target object To(j). The value PixRowΔ(i,j) may be a quantity of pixel rows separating the center pixel CP(i) and the centroid pixel PixTO(i,j). The function of the data element F1 [PixColΔ(i,j), PixRowΔ(i,j), ElevCP(i,j)] may comprise a lookup table and may be derived based on the relationships, described above in connection with FIG. 4B, between vectors respectively originating at each of the pixels of the camera 14($i$).

The data element F2[PixColΔ(i,j), PixRowΔ(i,j), AzimCP(i,j)] may be a function that, based on input elements PixColΔ(i,j), PixRowΔ(i,j), and AzimCP(i), outputs a value for AzimTO(i,j). The output value AzimTO(i,j) may be an azimuth angle, relative to the reference horizontal direction, of the vector VTO(i,j). The input values PixColΔ(i,j), PixRowΔ(i,j), and AzimCP(i) are described above. The function of the data element F2[PixColΔ(i,j), PixRowΔ(i,j), AzimCP(i)] may comprise a lookup table and may also be derived based on the relationships, described above in connection with FIG. 4B, between vectors respectively originating at each of the pixels of the camera 14($i$).

The data element PV(c,r)[PixColΔ(i,c), PixRowΔ(i,r), AzimCP(i)] may be a function that, based on input elements PixColΔ(c,r) (a number of pixel columns separating pixel c,r and the center pixel CP(i)), PixRowΔ(c,r) (a number of pixel rows separating pixel c,r and the center pixel CP(i)), and AzimCP(i), outputs data indicating a vector PV(c,r). The vector PV(c,r) may be a vector, corresponding to a pixel at column c, row r, located in the FOV of camera 14(i). A vector PV(c,r) may be an edge vector corresponding to a pixel at the edge of a camera 14 imaging element. For example, and for a camera 14(i) having an imaging element with C columns and R rows of pixels, c may have values from 1 to C and r may have values from 1 to R. Edge vectors at the corners of the FOV may be PV(1,1) (corresponding to pixel 1,1), PV(C,1) (corresponding to pixel c,1), PV(1,R) (corresponding to pixel 1,R), and PV(C,R) (corresponding to pixel C,R). Between each of the corners, edge vectors may be determined for some or all edge pixels between those corners. For example, an edge vector PV(c1,1) may correspond to edge pixel c1,1 between pixels 1,1 and C,1 (with 1<c1<C), an edge vector PV(C,r2) may correspond to edge pixel C,r2 between pixels C,1 and C, R (with 1<r2<R), an edge vector PV(c2, R) may correspond to edge pixel c2,R between pixels 1,R and C,R (with 1<c2<C), and an edge vector PV(1,r1) may correspond to edge pixel 1,r1 between pixels 1,1 and 1,R (with 1<r1<R).

The system 10 may operate using search cycles. During a search cycle, each of the cameras 14(i) may simultaneously capture an image Im(i). Each of the cameras 14(i) may store the image Im(i) that it captures, as well as values for the pan angle (pan(i)) and the tilt angle (tilt(i)) at the time the image Im(i) was captured. Based on an image Im(i) and on values for pan(i) and tilt(i), as well as data described above in connection with Table 1 and FIGS. 5A through 5C, the computer 18 may determine vectors VTO(i,j) for j target object images in the image Im(i). Each of the vectors VTO(i,j) may comprise, for example, the location of the camera 14(i) and the angles AzimTO(i,j) and ElevTO(i,j) for the vector VTO(i,j). Using vectors VTO obtained for multiple cameras 14 during the same search cycle, the computer 14 may determine positions of target objects in the search space 11.

As described in further detail below, various known algorithms can be used to determine whether an image Im(i) comprises target object image. However, such algorithms may be computationally intensive. Performing such algorithms for an entire image (e.g., across all pixels of that image) may be impractical when trying to track moving objects such as UAVs in real time. If there are multiple moving objects in a search space, the challenges may be even greater. To address one or more of the challenges associated with detecting target objects using multiple cameras, search points may be used to limit the amount of a particular image Im(i) that must be processed when searching for a target object.

Figure 6:
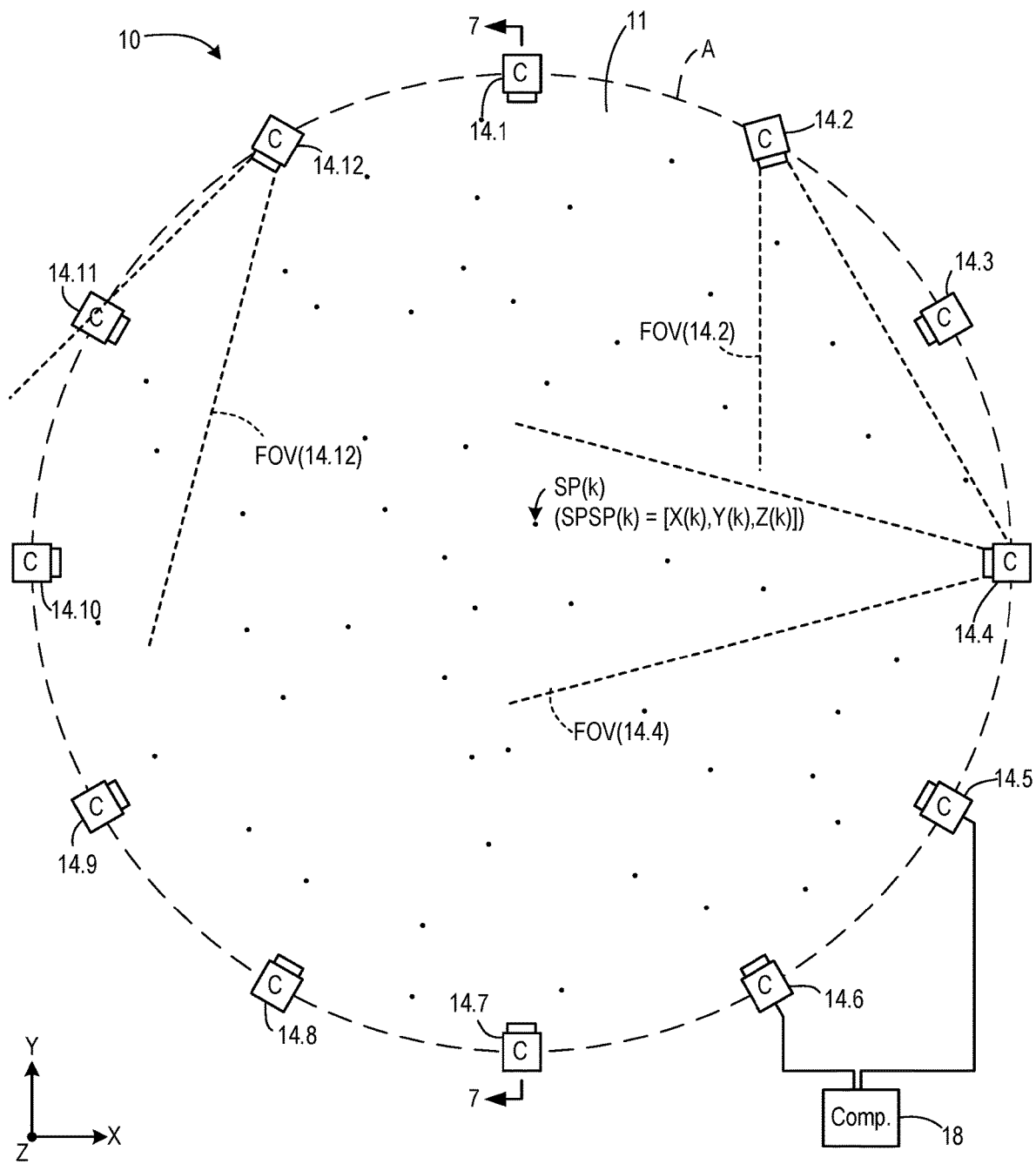
FIG. 6 is a partially schematic plan view of the system of FIG. 1, showing a plurality of search points.
Figure 7:
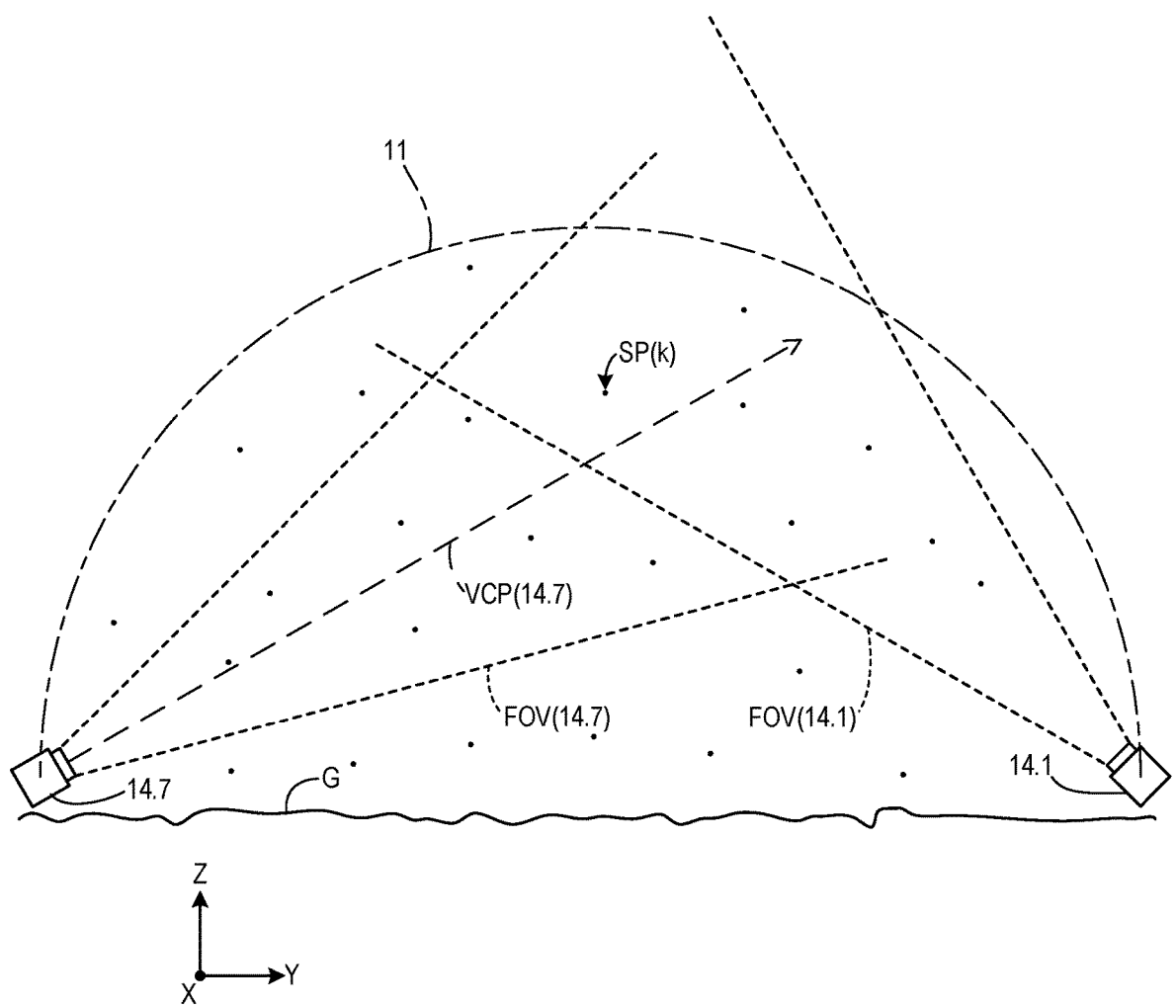
FIG. 7 is a partially schematic elevational view of the system of FIG. 1 showing a plurality of search points.

FIG. 6 is a partially schematic plan view of the system 10, similar to FIG. 1, showing a plurality of search points in the search space 11. FIG. 7 is a partially schematic elevational view, similar to FIG. 2, showing a portion of that same plurality of search points. For purposes of explanation, search points are indicated in FIGS. 6 and 7 and in other drawings as dots. However, a search point may be an invisible point in space. For convenience, only a single search point SP(k) is labelled in FIGS. 6 and 7. In connection with the drawings and description herein, "k" may be a counter variable corresponding to a $k^{th}$ search point SP, with k having an integer value between 1 and K. K may, for example, have a value in the hundreds (e.g., K=500, K=600, K=750, K=900, etc.), thousands (e.g., K=1000, K=2000, etc.), or millions. As explained in more detail below, positions of search points may change (e.g., between every search cycle), but a quantity of search points may remain constant from cycle to cycle.

Each search point SP(k) may correspond to a search point spatial position SPSP(k) having coordinates X(k), Y(k), Z(k) in the search space 11. Each search point spatial position may be assigned by the computer 18. For a given search point SP(k) and camera 14(i), and based on the coordinates of the search point spatial position SPSP(k), on the pan(i) and tilt(i) angles for the current orientation of the camera 14(i), and on the information for the camera 14(i) described in connection with Table 1 and FIGS. 5A through 5C, the computer 18 may geometrically determine if the search point SP(k) is in the FOV of the camera 14(i). If the search point SP(k) is in the FOV of the camera 14(i), the computer may project that search point SP(k) onto an image Im(i) captured by that camera 14(i). For example, and based on the same data used to determine if the search point SP(k) is in the camera 14(i) FOV, the computer 18 may geometrically determine a position of the search point SP(k) in the image Im(i). A position of a search point SP(k) in an image Im(i), which may represent the position in the image the search point SP(k) may appear if the search SP(k) were visible, may be referred to as a search point image position SPIP(i,k). Positions in an image from a camera 14(i) may be described, for example, using a coordinate system (local to images from that camera 14(i)) based on pixel rows and pixel columns.

Based on a search point image position SPIP(i,k) in an image Im(i), a subimage ImSub(i,k) corresponding to the search point image position SPIP(i,k) may be selected. The subimage ImSub(i,k) may comprise, for example, an M×M block of image Im(i) pixels centered on the search point image position SPIP(i,k). Example values for M may comprise, for example, values equal to a sum of 1 added to a power of 2 (e.g., M=9, M=17, M=33, M=65, etc.). The subimage ImSub(i,k) may then be processed, using one or more algorithms described below, for detection of a target object (e.g., to determine if the subimage comprises a target object image). Although a target object in a camera FOV may not be detected if that target object is not sufficiently near a search point, the computational load reduction from processing less than entire images allows search cycles to be performed more rapidly. If one or more of the cameras 14 change orientation between successive search cycles, and/or if the spatial positions of search points change between successive search cycles, the likelihood of capturing a target object in at least some images may be increased.

Figure 8A:
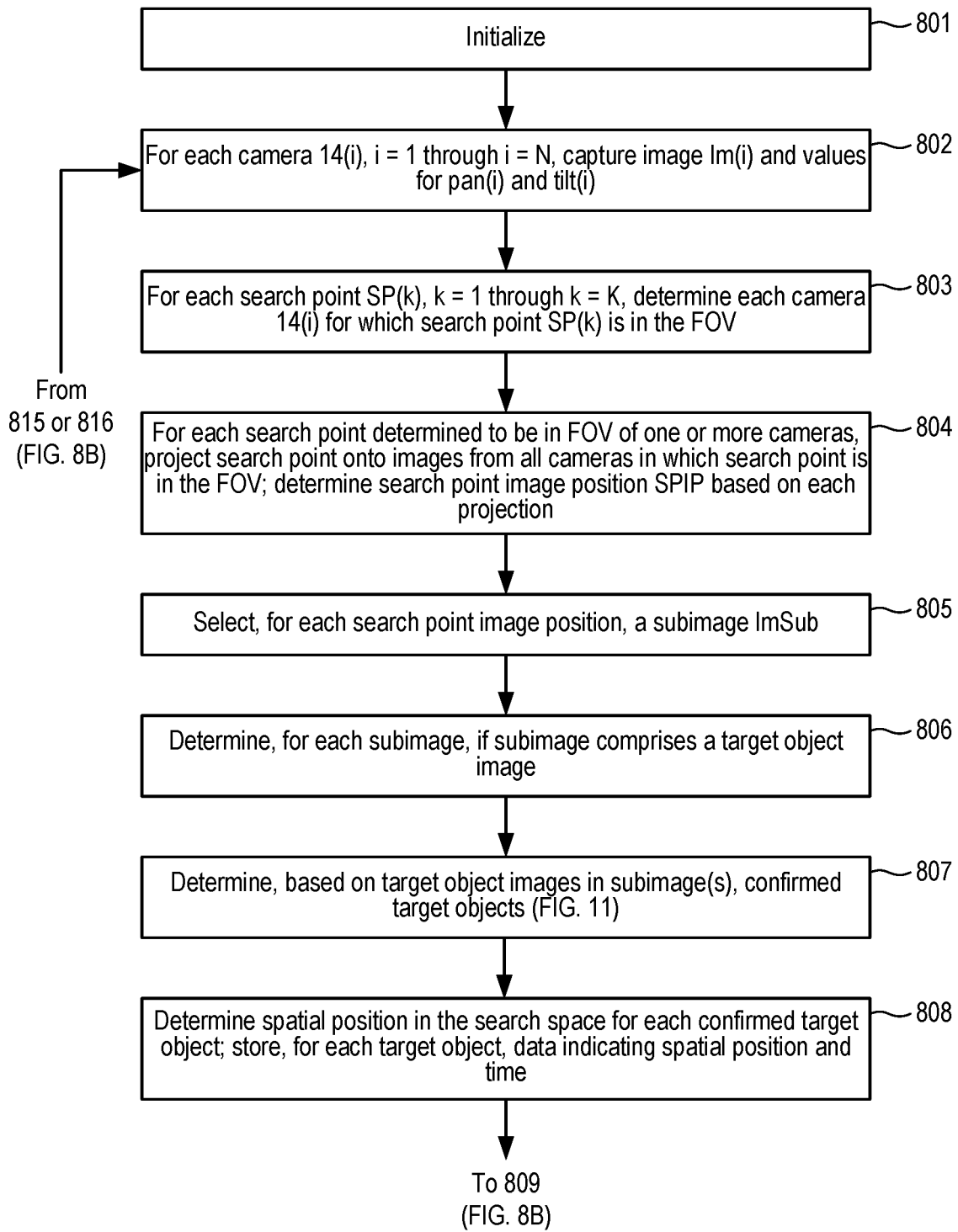
FIGS. 8A and 8B are a flow chart showing an example method for detecting target objects in a search space.
Figure 8B:
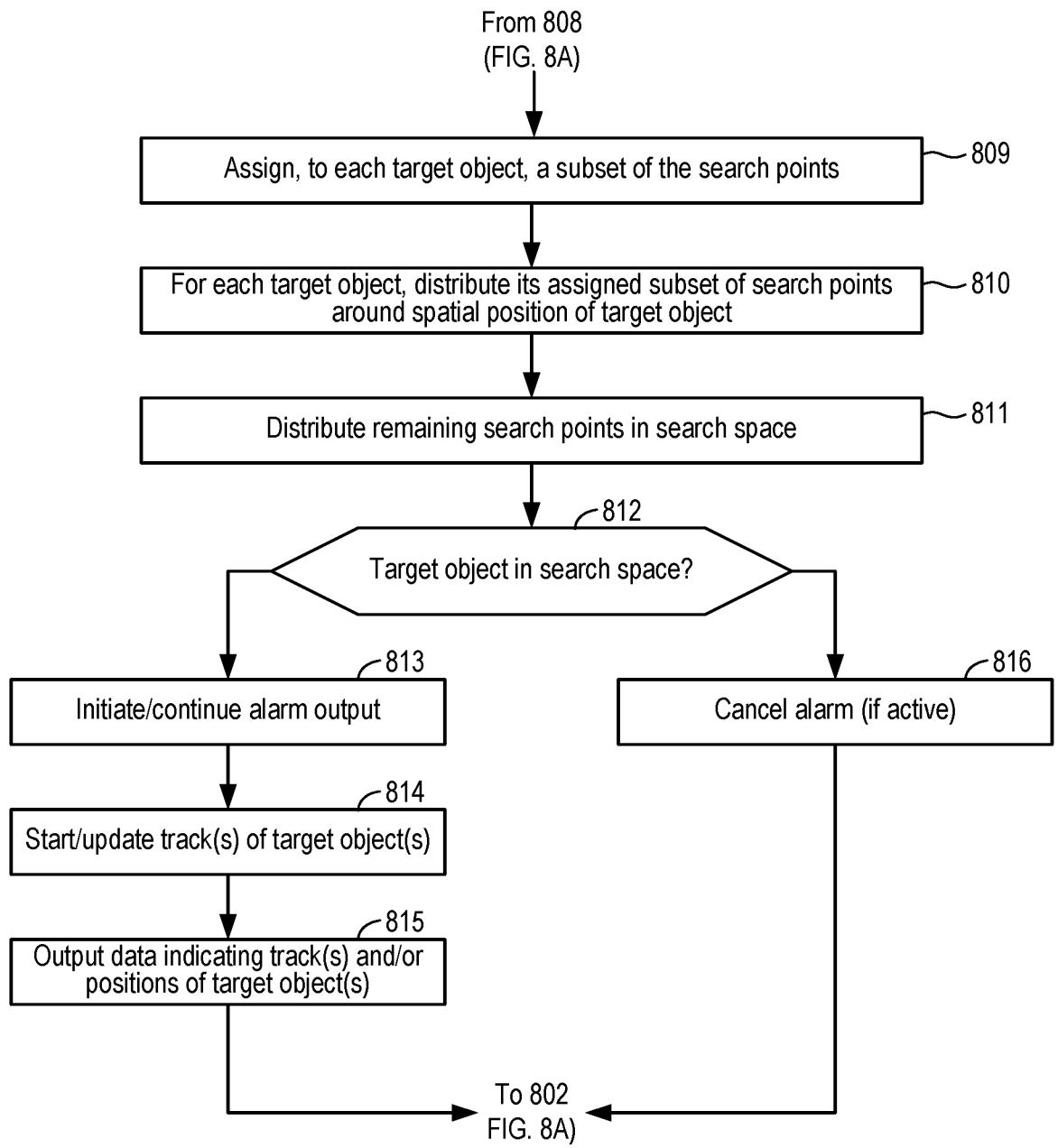
Figure 11:
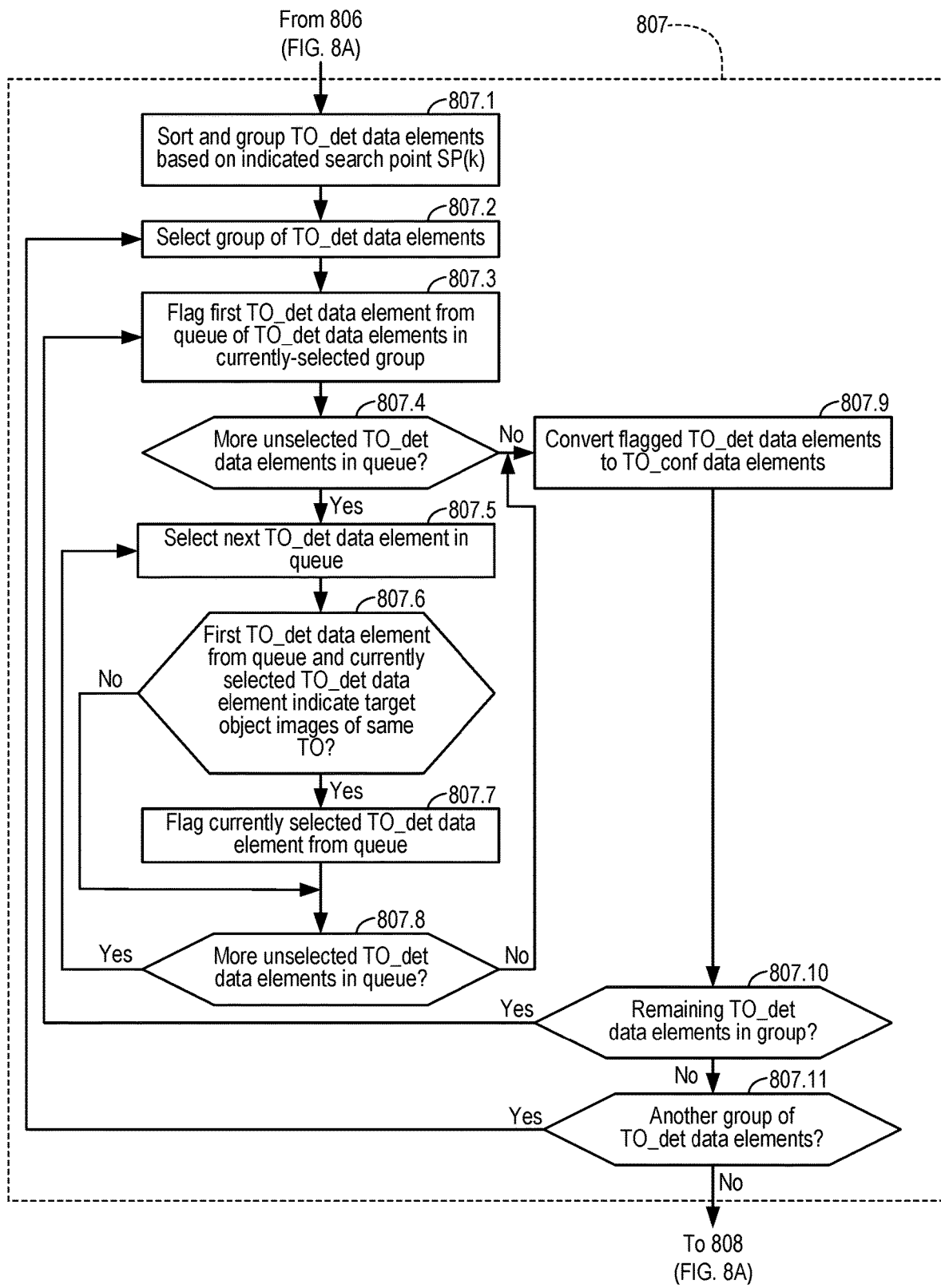
FIG. 11 is a flow chart showing an example of additional steps that may be performed as part of the example method shown in FIGS. 8A and 8B.
Figure 12:
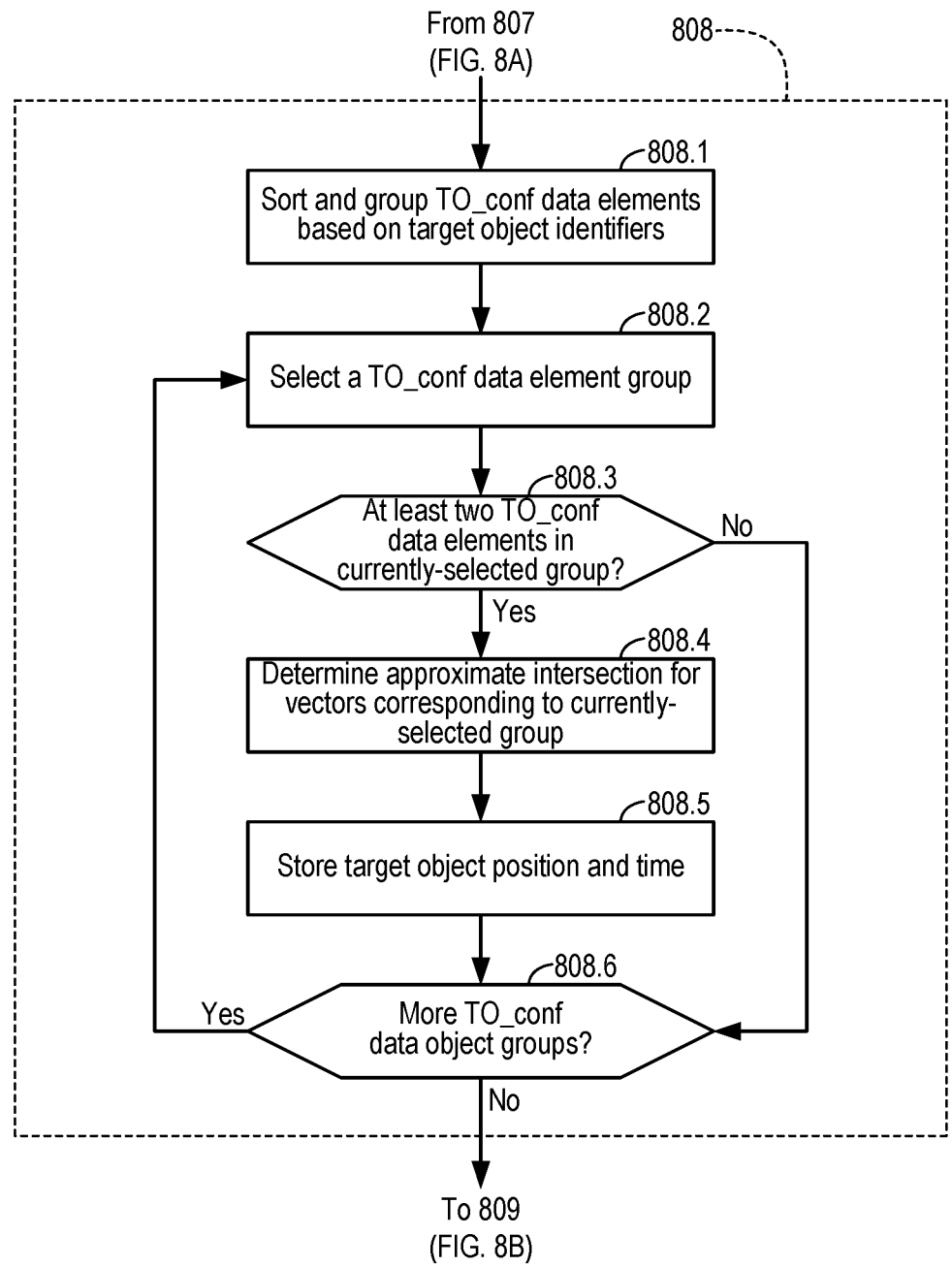
FIG. 12 is a flow chart showing an example of additional steps that may be performed as part of the example method shown in FIGS. 8A and 8B.

FIGS. 8A and 8B are a flow chart showing an example method for detecting target objects in a search space. FIGS. 11 and 12 (described below) show additional steps of the example method that have been provided as separate drawing figures for convenience, but that may be part of the same example method. The method of FIGS. 8A, 8B, 11, and 12 may be performed for the search space 11 using the system 10. Although various operations shown in FIGS. 8A, 8B, 11, and 12 are described as performed by the computer 18, one, some, or all such operations (or parts thereof) may be performed by one or more additional computing devices. The order of steps shown in FIGS. 8A, 8B, 11, and 12 may be varied, and/or one or more steps may be omitted, and/or one or more steps may be added.

In step 801, the system 10 may be initialized. As part of step 801, the computer 18 may send instructions to the control devices 30 of the cameras 14 for pan and tilt movements of each of the cameras 14. For example, a first camera 14 may be instructed to continuously pan back and forth between a first pair of pan angle values over first successive pan time periods, while continuously tilting up and down between a first pair of tilt angle values over first successive tilt time periods. A second camera 14 may be instructed to continuously pan back and forth between a second pair of pan angle values over second successive pan time periods, while continuously tilting up and down between a second pair of tilt angle values over second successive tilt time periods. Additional cameras 14 may be similarly instructed. The ranges of pan angles over which the cameras pan may be the same or different, as may be the ranges of tilt angles over which the cameras tilt. For example, one camera 14 may be instructed to pan back and forth over a relatively narrow pan range (e.g., 10 degrees) and/or to tilt up and down over a relatively narrow tilt range (e.g., 10 degrees). Another camera 14 may be instructed to pan back and forth over a relatively wide pan range (e.g., 180 degrees) and/or to tilt up and down over a relatively wide tilt range (e.g., 90 degrees). Similarly, the pan time periods of the cameras 14 may be the same or different, as may be the tilt time periods of the cameras.

Also as part of step 801, the computer 18 may determine a spatial position, in the search space 11, for each search point SP(k) in a set of K search points. The computer 18 may determine the search point spatial positions by selecting positions (e.g., XYZ coordinates) distributed throughout the search space 11. The computer 18 may select the search point spatial positions randomly, according to one of multiple predetermined patterns, and/or in other ways.

From step 801, the computer may proceed to step 802 and begin a search cycle. A search cycle may begin with step 802 and may comprise steps 802 through 815 (FIG. 8B) or 816. As part of step 802, the computer 18 may instruct the control devices 30 of all the cameras 14(i), for i=1 through i=N, to capture an image Im(i), and to store values for a corresponding pan angle pan(i) and a corresponding tilt angle tilt(i) at the time the image Im(i) is captured. Based on receiving the instructions from the computer 18, the control devices 30 may cause each of the cameras 14 to capture an image and may store the captured images with the corresponding pan and tilt angles. The control devices 30 may send the captured images with the corresponding pan and tilt angles to the computer 18.

From step 802, the computer may proceed to step 803. As part of step 803, the computer 18 may determine, for each of the search points SP(k), each of the cameras 14(i) for which the search point is in the FOV. Depending on the distribution of the search points and on the orientation of the cameras, each search point may be located in the FOV of none, some, or all of the cameras. The below pseudocode shows an example of an algorithm by which step 803 may be performed.

For k=1 to k=K
  For i=1 to i=N
    If search point spatial position SPSP(k) is located in portion of search space 11 defined by FOV of camera 14(i), store an SPinFOV data element indicating SP(k), SPSP(k), and camera 14(i)
    increment i by 1
  increment k by 1

The computer 18 may determine if a search point spatial position SPSP(k) is in a portion of the search space 11 defined by an FOV of camera 14(i) based on data for the camera 14(i) described above in connection with Table 1, and based on the values of pan(i) and tilt(i) for the camera 14(i). The computer 18 may, for example determine a vector SPSP(k)-14(i) passing through the search point spatial position SPSP(k) and the spatial coordinates (X(i), Y(i), Z(i)) of the camera 14(i). Based on whether the vector SPSP(k)-14(i) is between edge vectors for the image Im(i), the computer 18 may determine whether the search point SP(k) is in the portion of the search space 11 defined by the FOV of the camera 14(i).

From step 803, the computer may proceed to step 804. In step 804, and for each of the search points determined in step 803 to be within the FOV of one or more of the cameras 14, the computer 18 may project the search point onto images Im of all cameras 14 for which the search point is in the FOV. In connection with each projection, the computer 18 may determine a search point image position SPIP(i,k). Each search point image position SPIP(i,k) may indicate the position, in an image Im(i) having a FOV in which a search point SP(k) is located, of a projection of the search point SP(k). Although "i,k" is included in "SPIP(i,k)" to indicate that each search point image position may correspond to a specific image Im(i), from a specific camera 14(i), and a specific search point SP(k), there may not be a search point image position corresponding to every combination of i and k values.

The computer 18 may, for example, perform step 804 using the data elements SPinFOV stored in step 803. A data element may comprise any type of data structure or combination of data structures. As indicated above, each data element SPinFOV indicates a search point spatial position SPSP(k) for a search point SP(k) located in the FOV of a camera 14(i). A data element may indicate data by, for example, including a copy of that data, including a pointer to that data, and/or by otherwise referencing (directly or indirectly) that data. For each SPinFOV data element, the computer 18 may determine a vector SPSP(k)-14(i) based on the indicated search point spatial position SPSP(k) and camera 14(i) and may then compare that vector SPSP(k)-14(i) to vectors corresponding to pixels of the indicated camera 14(i). The vectors to which the vector SPSP(k)-14(i) is compared may be determined using the data element PV(c,r) stored for the indicated camera 14(i). The search point image position SPIP(i,k) for the SPinFOV data element may be determined based on the vector PV(c,r) that is the closest match to the vector SPSP(k)-14(i). The search point image position SPIP(i,k) may be a position (e.g., specified using pixel column and row values) of the projected search point SP(k) in the image Im(i) from the indicated camera 14(i). Each search point image position SPIP(i,k) may be stored as part of an SPIPde(i,k) data element that also indicates the image Im(i) in which the search point image position SPIP(i,k) is located and the camera 14(i) that captured that image Im(i).

From step 804, the computer may proceed to step 805. In step 805, and for some or all of the search point image positions SPIP(i,k) determined in step 804, the computer 18 may select a subimage ImSub(i,k). Although "i,k" is included in "ImSub(i,k)" to indicate that each subimage may correspond to a specific image Im(i), from a specific camera 14(i), a specific search point SP(k), and a specific search point image location SPIP(i,k), there may not be a subimage corresponding to every combination of i and k values.

Figure 9A:
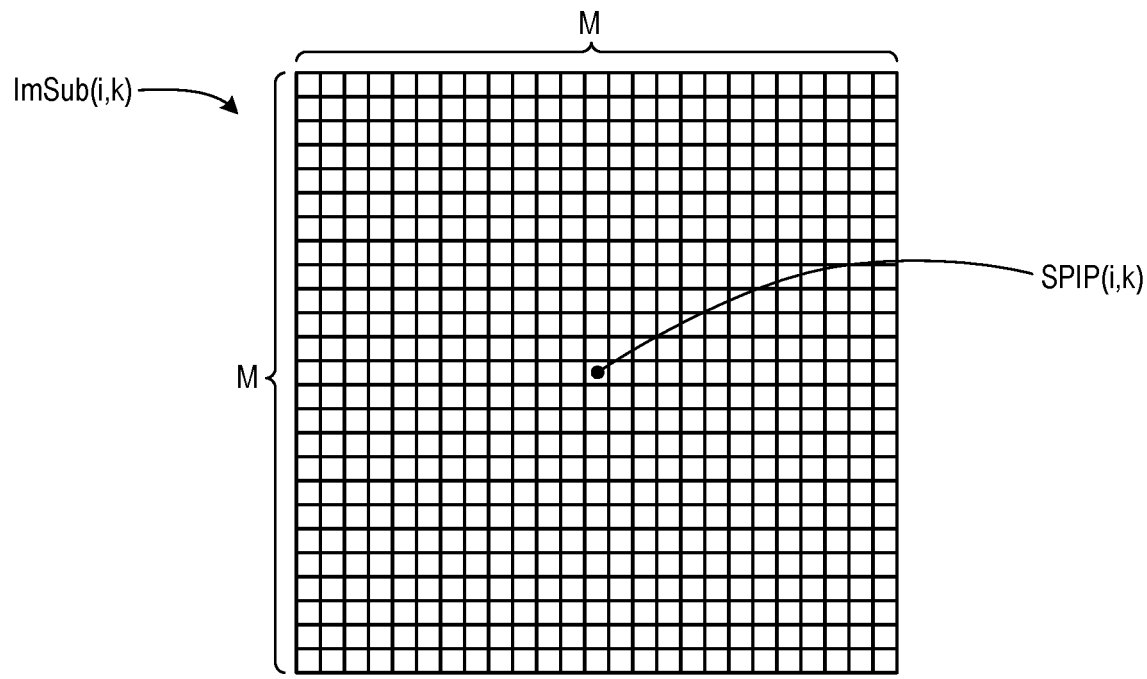
FIGS. 9A and 9B shows examples of subimages.

For each SPIPde(i,k) data element, the computer 18 may, for example, determine the image Im(i), the camera 14(i), and the search point image position SPIP(i,k) indicated by that data element. The computer 18 may then select, from that image Im(i), an M pixel by M pixel subimage centered on that search point image position SPIP(i,k). An example of a selected subimage is shown in FIG. 9A. Although M is 25 in FIG. 9A, M could be a larger or smaller value. Moreover, a selected subimage need not be square or perfectly centered on a search point image position. Each subimage ImSub(i,k) may be stored as part of an ImSubde(i,k) data element that also indicates the image Im(i) from which the subimage ImSub(i,k) was selected, the camera 14(i) that captured that image Im(i), and the search point image position SPIP(i,k) on which the subimage ImSub(i,k) is based.

Figure 9B:
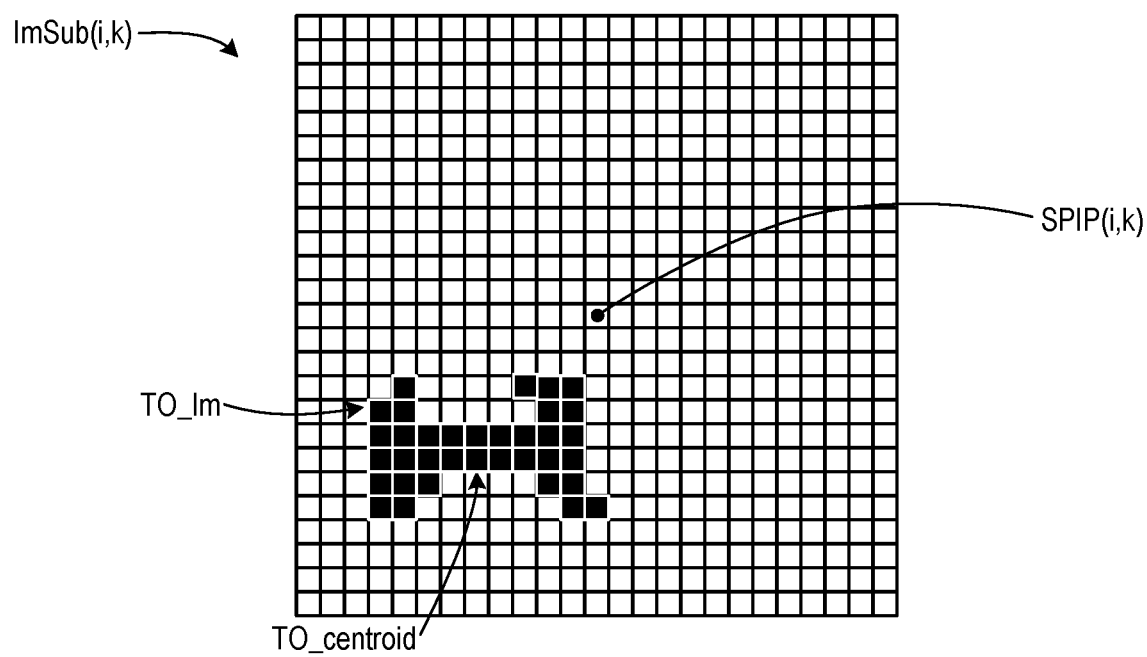

From step 805, the computer may proceed to step 806. In step 806, the computer 18 may determine, for each subimage ImSub(i,k), if the subimage comprises a target object image. FIG. 9A shows an example of a subimage without a target object image. FIG. 9B shows an example of a subimage ImSub(i,k) that contains a target object image TO_Im. The computer 18 may perform step 806 using any of various image processing algorithms for blob and/or feature detection and/or classification. Such algorithms may, for example, analyze data for multiple image portions (e.g., data for each of multiple pixels), process the data to eliminate or minimize a background, and determine whether something other than the background is present.

For example, the computer 18 may in step 806 perform sum of normalized difference of Gaussians processing for each subimage ImSub(i,k). Normalized Difference of Gaussians is an image processing method that may be used to artificially increase contrast of an image. A two dimensional Gaussian bump with a first kernel size (related to the sigma (a) value of the Gaussian ($exp(-D^2/(2\sigma^2))$), where D represents distance in pixels from the center of the bump) may be convolved with an image. Subsequently, the same image may be convolved with a second kernel size. These 2 convolved images may be subtracted in a pixel by pixel manner to generate a difference image. Another Gaussian bump with a third kernel size may be convolved with the original image and those values, on a per-pixel basis, divided into the difference image. With appropriately-selected the kernel sizes (e.g., determined by rule of thumb and/or by adjusting based on initial test images), salient features may be enhanced, and the results may be somewhat immune to the original brightness or darkness of the image.

As another example, the computer 18 may in step 806 perform pulse-coupled neural network (PCNN) image processing for each subimage ImSub(i,k). Using this approach, data for an image may feed a lattice of cells mapped to the image pixels. The cells may be in a non-linear communication with their near neighbors. The non-linearity may derive from the cells being configured to fire based on the firing of their neighbors, but only after an exponential decay of their previous values falls below an inhibitory threshold. The firing pulses spread in repetitious waves across the image, lighting up (e.g., emphasizing) various parts of the image, in turn, based on their visual similarity with one another. By choosing an appropriate pulse to halt the firing pulses, image segments corresponding to target objects may be determined. Depending on which implementation of the network is used, there may be 8 control parameters shared in common among all the cells. A genetic algorithm may be used to set these 8 parameters so that the final pixel values, used as a mask, may designate the interesting features (e.g., one or more target objects) of the image. The genetic algorithm may also determine the pulse on which the network should be stopped for the best segmentation. The PCNN is based on a cat's 7 layer retina. The biological version of the PCNN is thought to account for the fact that cats have excellent night vision.

The above are few examples of algorithms that may be used to process each subimage ImSub(i,k) in step 806. Any of numerous known algorithms for detection of an object (e.g., for distinguishing background from an object) may be used. Examples include SIFT (Scale Invariant Feature Transform), SURF (Speeded Up Robust Features), Hasio-Sawchuk Textures, Entropy Images, and Sobel Edge Enhancement. More than one image processing algorithm may be applied in step 806. For example, a first image processing algorithm may be used in connection with processing of subimages from one or more first cameras, and a second image processing algorithm may be used in connection with processing of subimages from one or more second cameras. Also or alternatively, multiple image processing algorithms may be applied to each of one or more subimages.

As part of step 806, and for every target object image that the computer 18 determines to be present, the computer 18 may determine a position TO_centroid of a centroid of that target object image. An example of a centroid position TO_centroid is shown in FIG. 9B. The centroid position TO_centroid may, for example, be described by a quantity of pixel rows and columns separating TO_centroid from the SPIP(i,k) corresponding to the subimage ImSub(i,k) in which the target object image was determined. For each target object representation determined by the computer 18 in step 806, the computer 18 may store a separate TO_det data element corresponding to that target object image and to a detection of a target object. Each TO_det data element may indicate: an identifier assigned to that TO_det data element, the corresponding subimage ImSub(i,k) in which that target object image was determined, the search point SP(k) and/or the search point image location SPIP(i,k) corresponding to that subimage ImSub(i,k), the centroid position TO_centroid of the target object image, the image Im(i) from which the corresponding subimage was selected, the camera 14(i) that captured that image Im(i), and/or pan(i) and tilt(i) values for that camera 14(i).

Figure 10A:
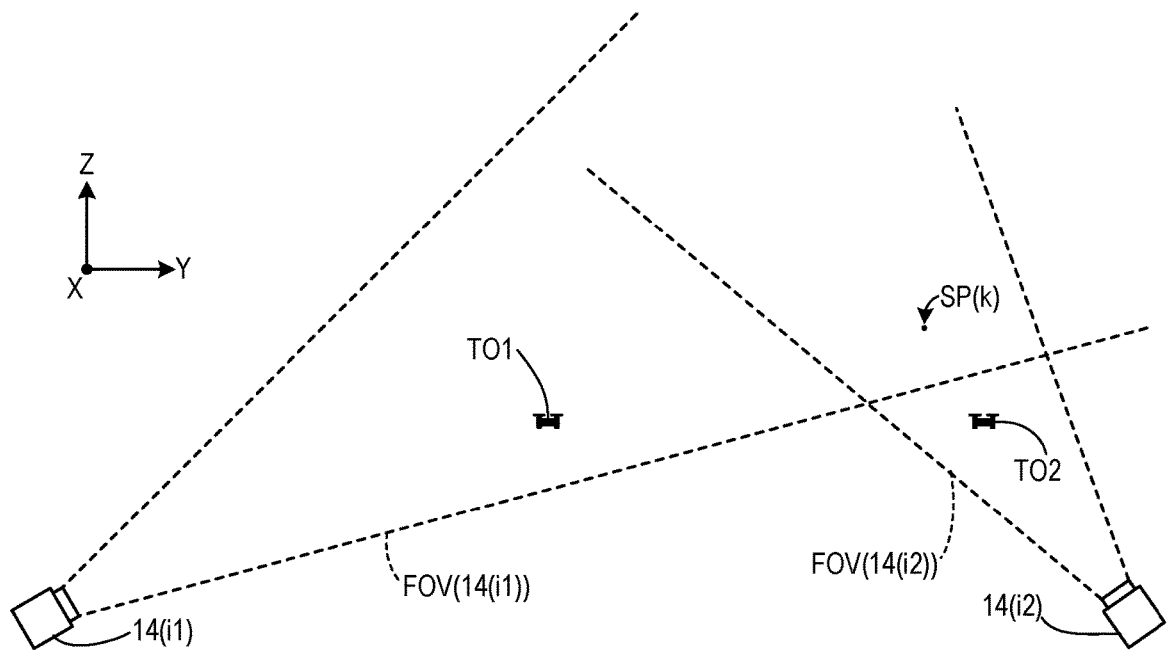
FIGS. 10A and 10B are partially schematic elevational and plan views, respectively, showing overlapping fields of view (FOVs) of two cameras.
Figure 10B:
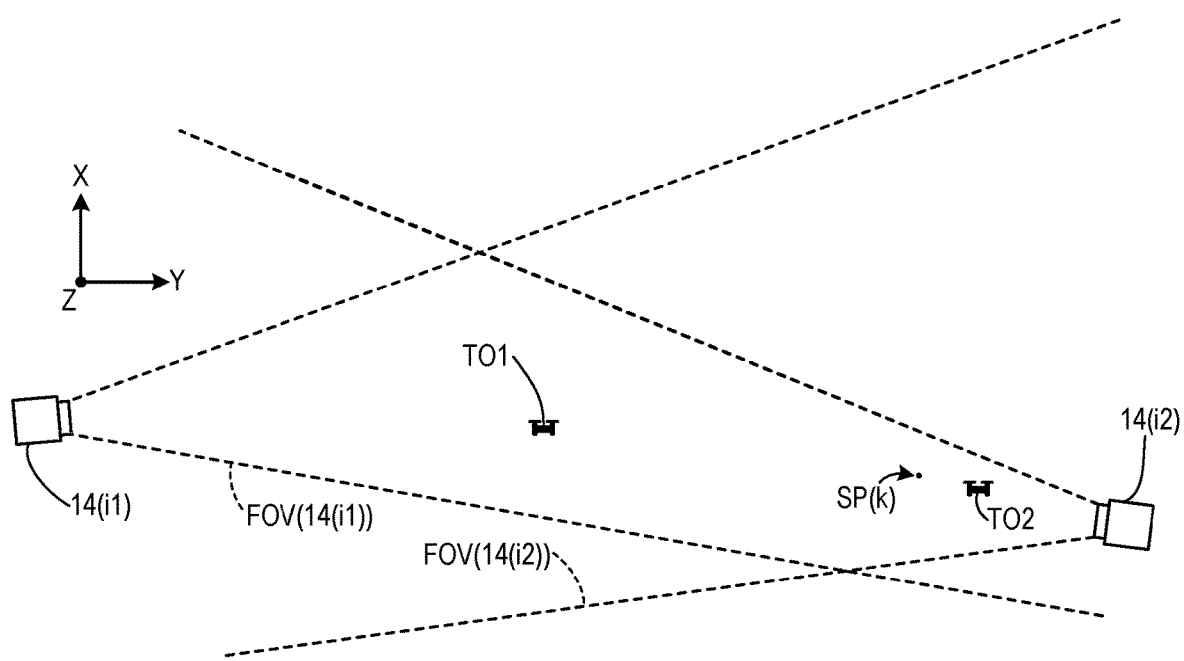

From step 806, the computer may proceed to step 807. In step 807, the computer 18 may determine, based on the target object images determined in step 806 (e.g., based on the TO_det data elements stored in step 806), a quantity of target objects that are present. Notably, two cameras 14 may simultaneously capture images of regions that comprise the same search point SP(k), and each of those images may comprise a representation of a target object near that search point. However, those two cameras 14 may not be imaging the same target object. FIGS. 10A and 10B show an example of how this may occur. FIG. 10A is a partially schematic elevational view showing an FOV(14(i1)) of a camera 14(i1) and an FOV(14(i2)) of a camera 14(i2). FIG. 10B is a partially schematic plan view showing the FOV(14(i1)) of the camera 14(i1) and the FOV(14(i2)) of the camera 14(i2) at same time as the time of FIG. 10A. The FOV(14(i1)) overlaps with the FOV(14(i2)). A search point SP(k) is located in the region of the overlap. A first target object TO1 is positioned in the FOV(14(i1)) between the search point SP(k) and the camera 14(i1), but is outside the FOV(14(i2)). A second target object TO2 is positioned in the FOV(14(i2)) between the search point SP(k) and the camera 14(i2), but is outside the FOV(14(i1)). Although the plan view of FIG. 10B suggests that both target objects TO1 and TO2 are in the FOVs of both cameras 14(i1) and 14(i2), the tilt of the cameras prevents the camera 14(i1) from seeing the target object TO2 and prevents the camera 14(i2) from seeing the target object TO1.

The computer 18 may perform step 807 by, for example, performing additional steps such as those shown in FIG. 11 (e.g., the steps of FIG. 11 may be a subroutine of the algorithm of FIGS. 8A and 8B). In step 807.1, the computer

18 may sort and group the target object images, determined in step 806, based on the search points associated with those target object images. The computer 18 may perform this sorting by sorting the TO_det data elements, stored in step 806, based on the search point SP(k) indicated by each of the TO_det data elements. A group of sorted TO_det data elements may comprise TO_det data elements that all indicate the same search point SP(k).

In step 807.2, the computer 18 may select a group of TO_det data elements. In step 807.3, the computer 18 may flag a first TO_det data element in a queue formed from all the TO_det data elements in the currently-selected group. In Step 807.4, the computer 18 may determine if there are additional TO_det data elements in the currently-selected group that have not yet been selected for evaluation relative to the first TO_det data element that was flagged in step 807.3. That evaluation is described below in connection with step 807.6. If there are no additional TO_det data elements in the currently-selected group that have not yet been selected for evaluation relative to the first TO_det data element, and as indicated by the "no" branch, the computer 18 may proceed to step 807.9, described below. If there are additional TO_det data elements in the currently-selected group that have not yet been selected for evaluation relative to the first TO_det data element, and as indicated by the "yes" branch, the computer 18 may proceed to step 807.5 and select the next TO_det data element in the queue that has not yet been evaluated relative to the first TO_det data element.

In step 807.6, the computer 18 may evaluate the first TO_det data element relative to the currently-selected TO_det data element from step 807.5. As part of step 807.6, the computer 18 may determine if the target object image indicated by the first TO_det data element and the target object image indicated by the currently-selected TO_det data element are images of the same target object. The computer 18 may make this determination in any of various ways. For example, the computer 18 may use epi-polar geometry or trilinear tensors to determine if the subimage ImSub(i,k) indicated by the first TO_det data element and the subimage ImSub(i,k) indicated by the currently-selected TO_det data element are views of a common point in space that coincides with the centroid position TO_centroid indicated by the first TO_det data element and with the centroid position TO_centroid indicated by the currently-selected TO_det data element.

If the computer 18 determines that the target object images indicated by the first and currently-selected TO_det data elements are not images of the same target object, the computer 18 may proceed to step 807.8 (described below). If the computer 18 determines that the target object images indicated by the first and currently-selected TO_det data elements are images of the same target object, the computer 18 may proceed to step 807.7. In step 807.7, the computer 18 may flag the currently-selected TO_det data element for further processing described below in connection with step 807.9.

In step 807.8, the computer 18 may determine if there are additional TO_det data elements, in the queue of TO_det data elements of the currently-selected group, that remain for evaluation relative to the first TO_det data element. If so, and as indicated by the "yes" branch, step 807.5 may be repeated. If not, and as indicated by the no branch, the computer 18 may proceed to step 807.9 (described below).

If the computer 18 determines in step 807.4 that there are no additional TO_det data elements in the currently-selected group that have not yet been selected for evaluation relative to the first TO_det data element, and as indicated by the "no" branch, the computer 18 may proceed to step 807.9. The computer 18 may in step 807.9 convert all of the flagged TO_det data elements, which the computer has now confirmed to correspond with the same target object, into TO_conf data elements. This conversion may remove the converted data elements from the queue of TO_det data elements in the currently-selected group. As part of step 807.9, the computer 18 may assign a common target object identifier to the TO_conf data elements so that they may be easily distinguished from TO_conf data elements corresponding to different target objects. In step 807.10, the computer 18 may determine if there are any remaining TO_det data elements in the currently-selected group that have not been converted to TO_conf data elements. If so, and as indicated by the "yes" branch, step 807.3 may be repeated. If not, and as indicated by the "no" branch, the computer 18 may proceed to step 807.11 and determine if there are any additional groups of TO_det data elements that have not yet been selected. If yes, and as indicated by the "yes" branch, step 807.2 may be repeated. If not, and as indicated by the "no" branch, the computer 18 may proceed to step 808 (FIG. 8A).

In step 808 the computer 18 may determine, for each confirmed target object, a spatial position of that confirmed target object in the search space 11. The computer 18 may perform step 808 by, for example, performing additional steps such as those shown in FIG. 12 (e.g., the steps of FIG. 12 may be a subroutine of the algorithm of FIGS. 8A and 8B). In step 808.1, the computer 18 may sort and group the TO_conf data elements, stored during one or more iterations of step 807.9, based on target object identifiers. A group of sorted TO_conf data elements may comprise TO_conf data elements that all correspond to the same target object identifier. In step 808.2, the computer 18 may select one of the groups of sorted TO_conf data elements. In step 808.3, the computer 18 may determine if the currently-selected group of TO_conf data elements has at least two TO_conf data elements. If not, there may be insufficient data to determine a spatial position of the target object corresponding to the currently-selected group, and the computer 18 may proceed to step 808.6 (described below) as indicated by the "no" branch. Otherwise, and as indicated by the "yes" branch, the computer 18 may proceed to step 808.4.

In step 808.4, the computer 18 may determine a point approximating an intersection of vectors corresponding to each of the TO_conf data elements in the currently-selected group. For example, each of the TO_conf data elements may indicate a target object centroid position TO_centroid in an image Im(i) from a camera 14(*i*), a pan(i) angle for that camera 14(*i*), and a tilt(i) angle for that camera 14(*i*). Based on this information, and using the information described above in connection with Table 1, the computer 18 may determine a target object vector VTO (e.g., as described above in connection with FIGS. 5A and 5B) for the TO_conf data element. Because of imaging errors of one or more cameras and/or for other reasons, some or all of the target object vectors calculated for the TO_conf data elements in the currently-selected group may coincide with skew lines and may not truly intersect. However, an approximated intersection point can be calculated by determining a point P in the search space 11 such that a sum of the squares of the shortest distances, between the point P and each of the vectors VTO determined for the currently-selected group, is minimized. For example, for a currently-selected group of TO_conf data elements having G TO_conf data elements, the computer 18 may determine a point P that minimizes $$\left[\sum_{g=1}^{G} d(VTO_g, P)\right]^2,$$

wherein $VTO_g$ is a target object vector corresponding to the $g^{th}$ TO_conf data element of the currently-selected group, and $d(VTO_g, P)$ is the shortest distance between the point P and the target vector $VTO_g$.

In step 808.5, the computer 18 may store the position of the point P as the current position of the target object having the target object identifier corresponding to the currently-selected group. The computer 18 may also store a time (e.g., a current system time) with that position. In step 808.6, the computer 18 may determine if there are additional TO_conf data element groups, determined from the sorting and grouping in step 808.1, to be processed for determining a target object position. If so, and as indicated by the "yes" branch, the computer 18 may repeat step 808.1. If not, and as indicated by the "no" branch, the computer 18 may proceed to step 809.

In step 809 (FIG. 8B), the computer 18 may assign, to each target object for which a position was determined in step 808, a corresponding subset of K search points. A subset of search points assigned to a target object may comprise, for example 10 search points, 15 search points, 20 search points, or another quantity of search points. For each subset of search points, the computer 18 may position all of the search points in that subset in spatial positions that are based on the position determined for the corresponding target object. For example, the computer 18 may determine a spherical portion of the search space 11 that is centered on the determined target object position and that comprises a radius r. Example values of r include 2 meters, 5 meters, 10 meters, etc. The computer 18 may then randomly distribute the subset of search points in that spherical portion of the search space. By placing a portion of the search points near a currently-known position of a target object, the computer 18 may increase the probability that the target object will be detected in images captured during the next search cycle.

Figure 13:
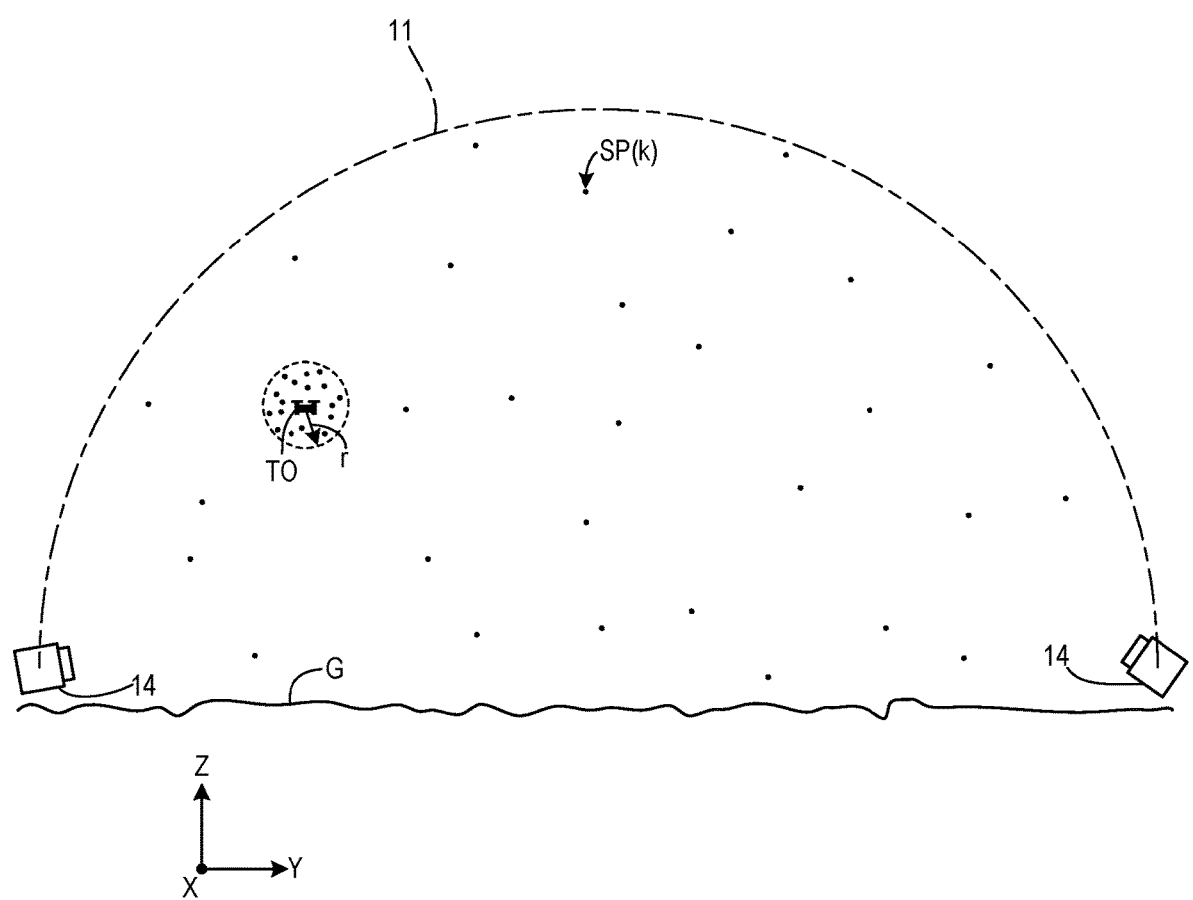
FIG. 13 is a partially schematic elevational view of the system of FIG. 1 after redistribution of search points.

In step 811, the computer 18 may distribute remaining search points that have not been assigned to a target object. The computer 18 may distribute those remaining search points throughout the search space 11 using the same method used in step 801. Optionally, the computer 18 may subtract any portions of the search space 11 determined in step 810 for individual target objects, and may avoid distributing any of the remaining search points in any of those portions. FIG. 13 is a partially schematic elevational view of the system of FIG. 1 after distribution of search points SP(k) in step 811. It is possible that a target object detected in a search cycle, and to which a subset of search points is assigned during that cycle, may escape detection in the next cycle. If this occurs, the quantity of search points in a subset of search points assigned to that target object, and/or a size of a region in which the search points of that subset may be positioned relative to the last known position of that target object, may be increased in subsequent cycles (e.g., until the target object is again detected).

In step 812, the computer 18 may determine if a target object was detected during the current search cycle. If so, and as shown by the yes branch, the computer 18 may proceed to step 813. In step 813, the computer 18 may initiate an audible alarm (e.g., actuate a siren, a buzzer, a voice recording, and/or other sound) and/or a visual alarm (e.g., a blinking light, a message on a display screen, and/or other visual indication) to indicate that a target object has been detected in the search space 11. If step 813 is reached during a search cycle following a search cycle in which a target object was detected, a previously-initiated alarm may be continued.

In step 814, the computer 18 may start or update a track for each of the target objects for which a position was determined in step 808. The computer 18 may start and/or update the track(s) of detected target objects based on the position and time data stored in step 808. As part of step 814, the computer 18 may determine, for each of the target objects for which a position was determined in step 808, whether that target object is the same as a target object for which a position was determined during a previous search cycle. Determining detections that should be correlated (e.g., determining that two detections are of the same object) and fusion (combining a string of detections of the same object in a mathematical way to reduce error (e.g., by using low order polynomial fitting)) may be complicated by the presence of numerous target objects (e.g., a "swarm") and by radical maneuvering of target objects. When target objects are numerous, one approach is to project the detections onto various datum planes to convert the 3D problem into a 2D problem. By determining an optimal plane for which an orthogonal projection operation may be performed, two close-by fliers may be distinguished and treated (e.g., engaged with fire) separately. Also, projection operations may "bunch up" the detections of separate target objects, making them easier to segment from their brethren. For radically maneuvering target objects, a useful principle is that any object with mass cannot instantaneously change direction or accelerate. For target objects such as UAVs, even those that can hover, any movement in a sufficiently short time interval may be indistinguishable from a straight line in space-time. Therefore, methods that assume straight line flight, sufficiently truncated in time, may be applied to the maneuvering case.

In step 815, the computer 18 may output (e.g., via a computer screen, an LED or OLED display device, and/or other video display device) data indicating the position and/or track of target objects for which positions were determined in step 808 of the current search cycle. For targets objects that may have been detected but for which a position could not be determined (e.g., because only a single camera 14 captured an image of the target object), the computer 18 may cause display of a warning indicating a possible detection, and further indicating that there is insufficient data to determine a position. As part of step 815, the computer 18 may also or alternatively output data indicating target object positions to a fire-control system that controls aiming of a gun or other countermeasure for disabling and/or destroying target objects.

If the computer 18 determines in step 812 that a target object was not detected during the current search cycle, and as shown by the "no" branch, the computer 18 may proceed to step 816. In step 816, the computer 18 may discontinue audio and/or visual warnings (if any) that were active at the end of a previous search cycle. At the conclusion of step 815 or 816, a current search cycle may conclude, and the computer 18 may proceed to step 802 (FIG. 8A) to begin a new search cycle.

Systems and methods such as are described herein may offer multiple advantages. The computational load to determine whether target object images are present in subimages may be substantially less than that needed to process entire images from the subimages are selected. This may allow for substantially faster search cycles without need for expensive computer equipment. Although performing target detection using subimages selected based on spatial sampling may miss a portion of target objects during a given cycle, changing positions of the search points and/or orientations of the cameras reduce the probability of a target object completely escaping detection. If a target object is detected, search points may be assigned to that target object and repositioned to increase the probability that the target object will continue to be detected. Detecting and tracking objects using an array of cameras may allow improved accuracy, relative to detecting and tracking with radar, at shorter ranges and/or in connection with smaller objects. An array of cameras, pan/tilt mounts, computers and other components of a system such as the system 10 may be substantially less expensive than a conventional radar. Moreover, an array of cameras may operate without emitting energy and may thereby avoid detection. Conversely, radar emits energy and is detectable, and may also pose a potential health hazard.

An array of cameras in a system similar to the system 10 may comprise cameras that are non-moving, or that move only in certain ways (e.g., only panning or only tilting). Cameras used in a system such as the system 10 may be operable in the infrared (IR) spectrum so as to capture images at night and/or in hazy or smoky conditions.

Cameras used in a system such as the system 10 may comprise video or still cameras. If video cameras are used, for example, cameras may be configured to continuously record video. Such cameras may, on command from the computer 18 or another computer, provide a frame of the video corresponding to a particular time and, if the camera is moving, pan and tilt angles for the camera at that particular time. Also or alternatively, a system such as system 10 and using video cameras may be configured to perform a modified version of the method described in connection with FIGS. 8A, 8B, 11, and 12. In a modified step 802, cameras may capture a series of images with pan and tilt data for each image. Steps 803-805 may be performed, for each image in a series of images from a camera, in a manner similar to how described above in connection with a single image from each camera.

A modified step 806 may be performed using one or more image processing algorithms that detect a transient feature in a series of images. For example, the computer 18 may in a modified step 806 process a series of M pixel by M pixel subimages, corresponding to the same search point, taken from slightly different positions in a series of images from a single moving camera. A third-order filter (e.g., a Butterworth filter) may be applied to each subimage pixel position (e.g., each of the $M^2$ positions based on the M×M pixel array of the subimages) over the series of subimages. The Butterworth Filter is a third-order time series filter which may take a noisy raw signal and smooth it out to make it less noisy. The behavior of the filter may be controlled by a single parameter, omegaT, set between 0 and 1. If omegaT=1.0, then the original signal, at the present instant, may result. If omegaT=0, then the output may eventually reach a constant DC value equal to the average of the history of the original signal. Appropriate selection of an intermediate value of omegaT results in a signal similar to the recent history of the original, yet less noisy. The calculations to implement this filter are simple, fast, and require very few remembered values. Every pixel's value may be based on a value from a subimage pixel plus a weighted sum of the recent history of that same pixel in other subimages, and a "smoothed out" version of the subimage obtained. The smoothed out version may be subtracted from each actual subimage in a series to indicate a transient feature such as a target object. Additional software may be used capture the novelties and flag them for further processing. For example, the subimage from a series that reveals, after subtraction of the smoothed out subimage, a target object may be identified. Additional steps of the method of FIGS. 8A, 8B, 11, and 12 may be performed, based on that identified subimage, in a manner similar to that previously described.

Cameras in a system such as the system 10 need not be arranged around a circle, and may be arranged in other manners (e.g., around other shapes, in a grid, irregularly, etc.). Cameras in a system such as the system 10 may be located at different heights relative to one another (e.g., some at or near ground level, some in towers, some on rooftops, etc.). Cameras may be located inside or outside a search space. For example, a search space may extend beyond a ring of cameras positioned inside the search space.

A combination of wide FOV and narrow FOV cameras may be used in a system such as the system 10. A wider FOV may increase the probability of detection, as the FOV may cover a larger portion of a search space and thus have a greater probability of capturing an image of a region with numerous search points. However, a wider FOV may increase resolution error. A narrower FOV may cover a smaller portion of a search space and may have less probability of capturing an image of a region with numerous search points, but may have less resolution error and allow for greater precision in determining target object position.

When projecting search points onto images from cameras having the search points in the FOVs of those cameras (e.g., as described in connection with step 804 of FIG. 8A), the computer 18 may be configured to ignore search point projections that result in search point image positions near an edge of an image. For example, if subimages will be selected based on an M×M block of pixels centered on a search point image position (e.g., as described in connection with step 805 of FIG. 8A), the computer 18 may be configured to ignore projections that result in a search point image position that is closer that M/2 pixels to an image edge.

Target object detection (e.g., as described in connection with step 806 of FIG. 8A) may comprise one or more additional steps to discriminate target objects. For example, one or more steps may be performed to determine if a detected target object is a man-made object such as a UAV or a natural object such as a bird. Data for objects determined to be natural objects (e.g., birds) may be ignored to conserve processing power and/or to help avoid use of UAV countermeasures against birds. Birds and UAVs may be distinguished in numerous ways. For example, birds and UAVs may be distinguished based on motion signatures. If search cycles are performed sufficiently fast, the motion characteristic of bird movements may become detectable after several cycles. After a target object is determined to be a bird, further tracking of that target object may be discontinued and/or information about that target object not sent to other systems (e.g., not sent to a fire control computer of a weapon or other countermeasure). Also or alternatively, if the cameras 14 include video cameras, target object motion may be independently analyzed by the cameras 14 (e.g., by control devices 30) to determine target objects that may be birds, and highlighting or other marking added to images to indicate birds.

A system such as the system 10 may be configured to train a camera on a detected target object. For example, if a target object is detected, the computer 18 may send pan/tilt instructions to one of the cameras 14 to keep the FOV of that camera 14 centered on the target object position and/or estimated position (e.g., based on target object track). Even while trained on a specific target object, however, that camera would still be able to provide images for detection of other target objects within its FOV.

Figure 14:
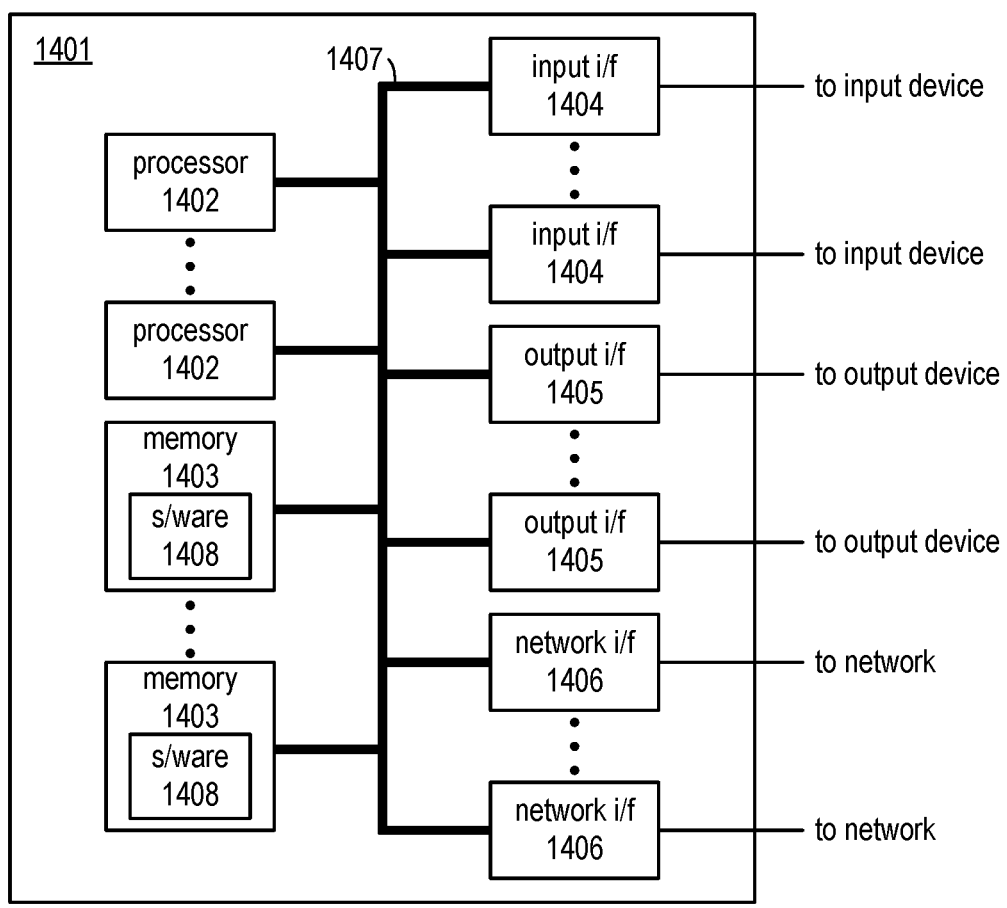
FIG. 14 is a block diagram of an example computer.

FIG. 14 is a block diagram of an example computer 1401, one or more of which may be used to implement the computer 18, the control device(s) 30, and/or other computer(s) and to perform operations such as those described herein. Computer 1401 may comprise one or more processors 1402, one or more memories 1403, one or more input interface controllers 1404, one or more output interface controllers 1405, and one or more network interfaces 1406, all of which may communicate over one or more busses 1407. Processor(s) 1402 may include any of various types of computational devices such as, without limitation, programmable microprocessors. Processor(s) 1402 may execute instructions that cause computer 1401 to perform one or more operations such as are described herein. Memory(ies) 1403 may include any of various types of non-transitory machine-readable storage media such as, without limitation, random access memory (RAM), read-only memory (ROM), FLASH memory, magnetic tape or discs, optical discs, etc. Memory(ies) 1403 may be volatile or non-volatile. Input interface controller(s) 1404 may include hardware and/or software that allow user input devices (e.g., a keyboard, a mouse, a touch screen) to communicate data to processor(s) 1402. Output interface controller(s) 1405 may include hardware and/or software that allow user output devices (e.g., display screens, printers) to output user-understandable information based on data from processor(s) 1402. Network interface(s) 1406 may include hardware and/or software that allow processor(s) 1402 to communicate with processors of other computers via one or more types of wired or wireless networks. Examples of network interfaces include, without limitation, Ethernet adaptors and Wi-Fi adaptors (e.g., operating in accordance with one or more IEEE 802.11 WLAN standards).

Memory(ies) 1403 may store software 1408 that provides instructions to processor(s) 1402 that, when executed by processor(s) 1402, cause computer 1401 to perform some or all operations such as are described herein. Software 1408 may comprise machine-executable instructions and/or other data, and may include both application software and operating system software. Executable instructions that cause computer 1401 to perform operations such as are described herein may also or alternatively be stored in other forms, e.g., as firmware or as hardware logic in an integrated circuit.

Figure 15A:
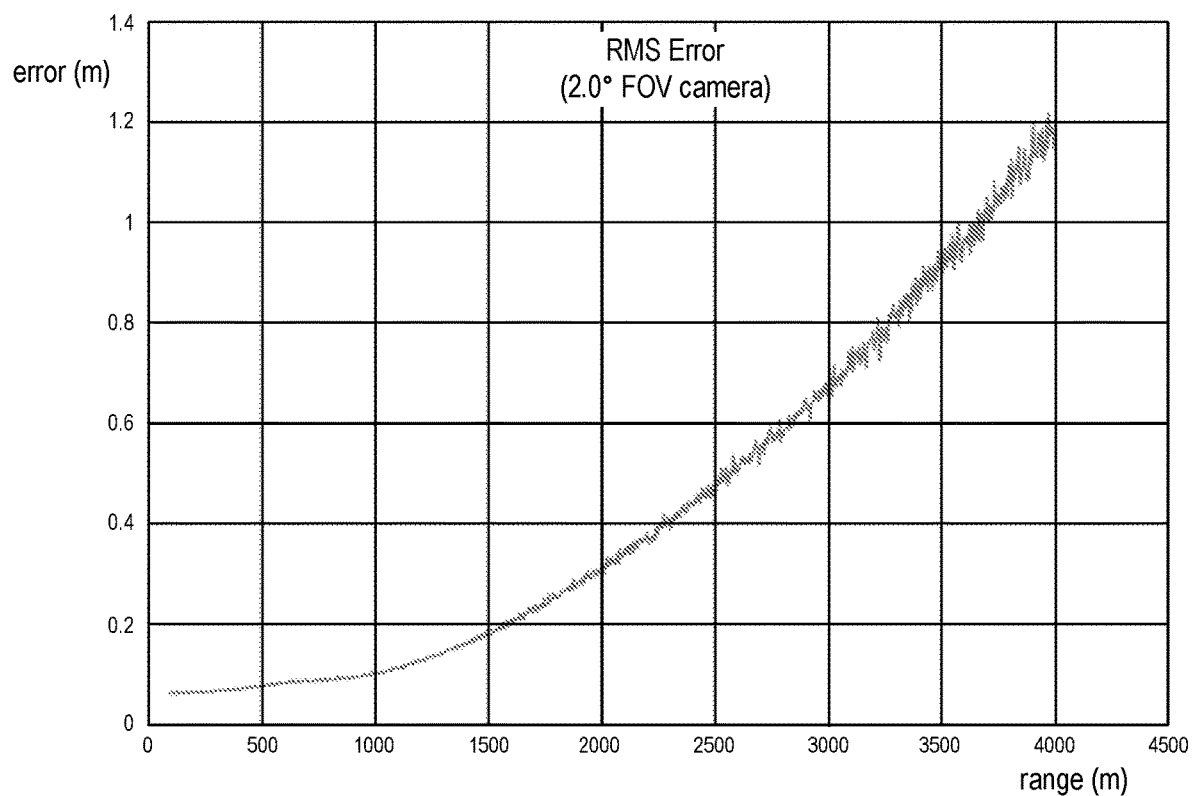
FIGS. 15A, 15B, and 15C are graphs showing estimated RMS error and error ellipsoid dimensions based on simulations.
Figure 15B:
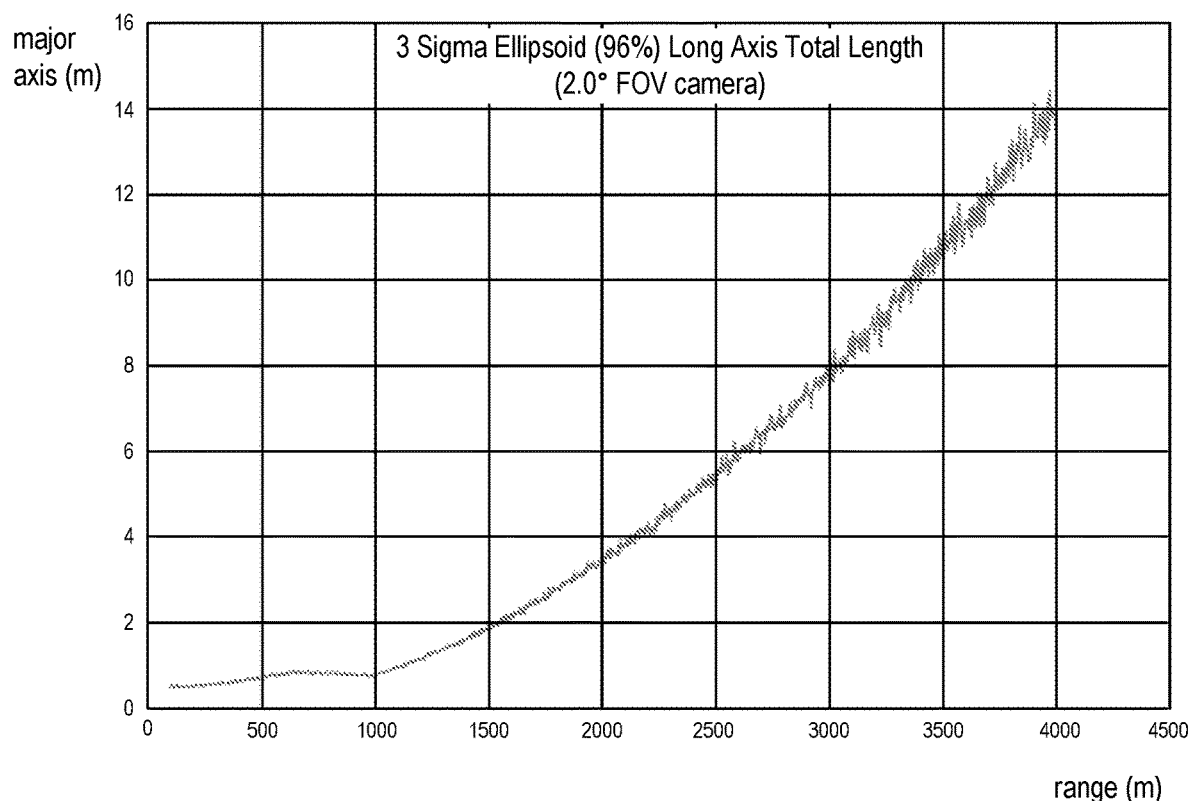
Figure 15C:
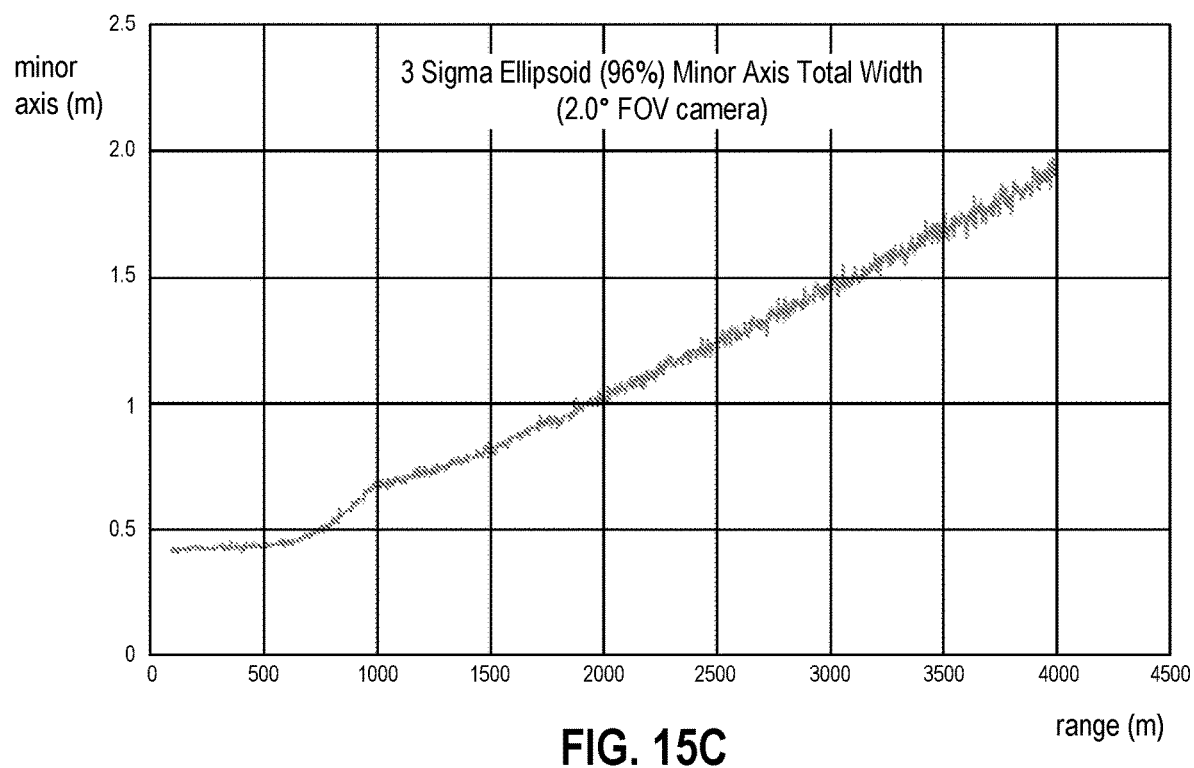

FIG. 15A is a graph showing estimated RMS error in meters, as a function of range (e.g., for multiple cameras, a value based on a center of a circle on which the cameras are positioned), for 10,000 Monte Carlo simulations of a system similar to those described above. The simulations of FIG. 15A assume a system with six high-resolution cameras arranged in a circle having a radius of 750 meters, each having an imaging element with 1920 columns by 1280 rows of pixels, and each having a 2 degree FOV. The simulations further assumed a target object at an altitude of 100 meters, with the cameras mounted at altitudes of 3 meters. The simulations also assumed an error model with a 1 sigma pixel error of 2 pixels, a 1 sigma pan angle error of 0.005 degrees ( ), and a 1 sigma tilt angle error of 0.005 degrees. During each simulation, the pixel error, pan angle error, and tilt angle error for each camera were randomly varied according to the error model. FIG. 15B is a graph of error ellipsoid major axis dimension (in meters), as a function of range, for the simulations of FIG. 15A. FIG. 15C is a graph of error ellipsoid minor axis dimension (in meters), as a function of range, for the simulations of FIG. 15A.

Figure 15D:
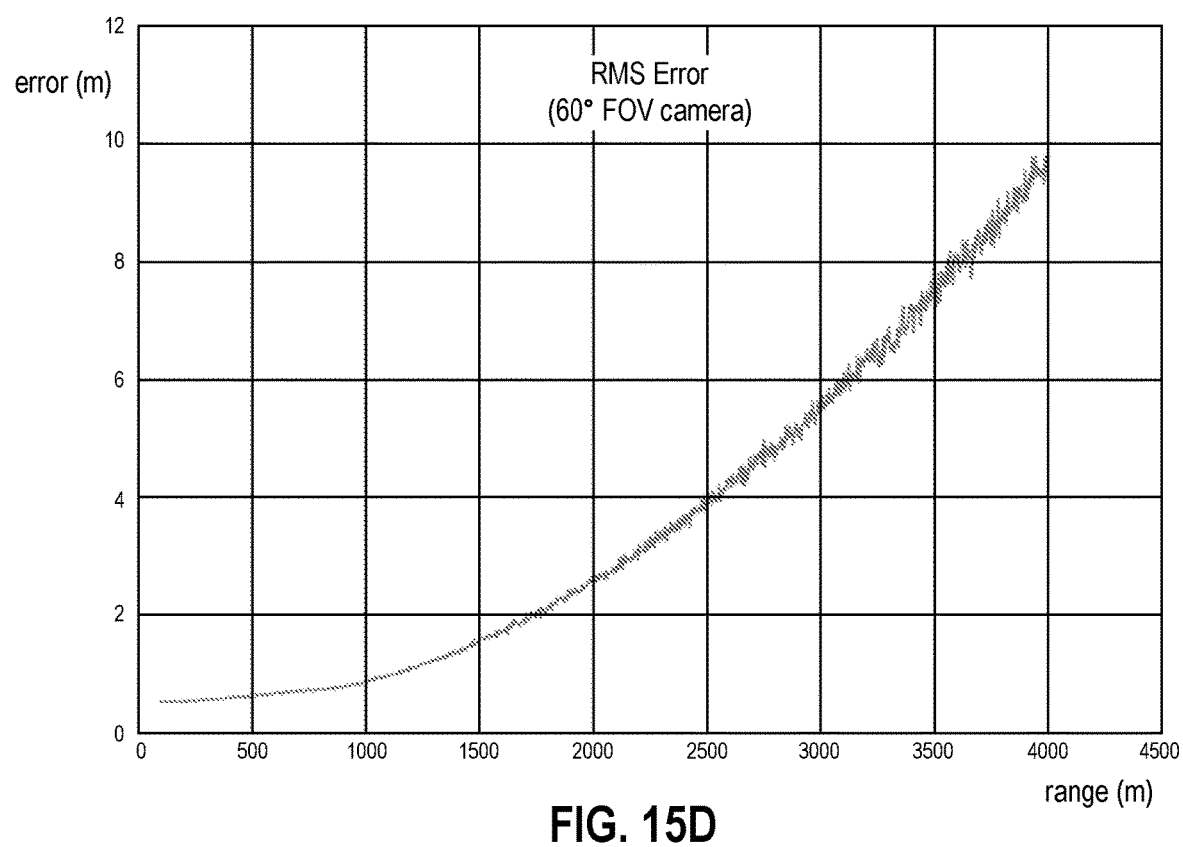
FIGS. 15D, 15E, and 15F are graphs showing estimated RMS error and error ellipsoid dimensions based on additional simulations.
Figure 15E:
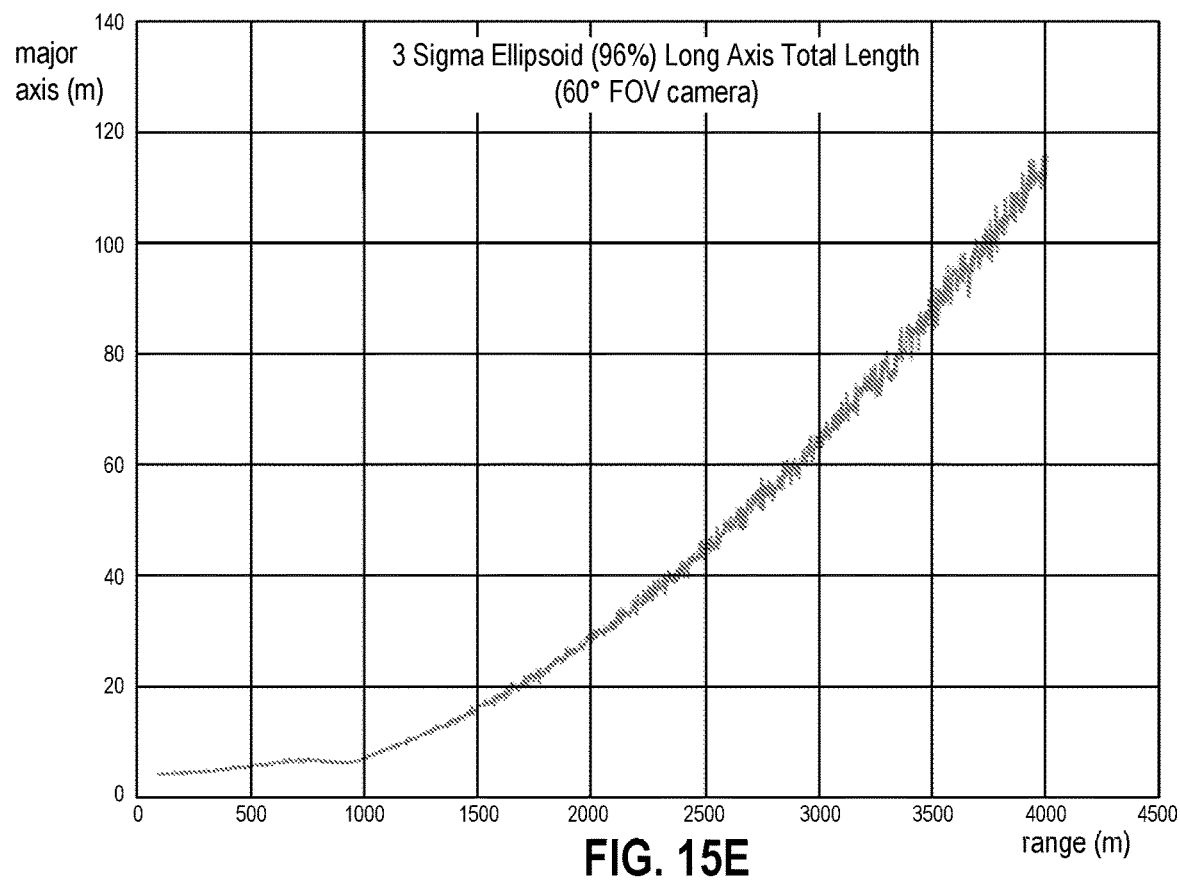
Figure 15F:
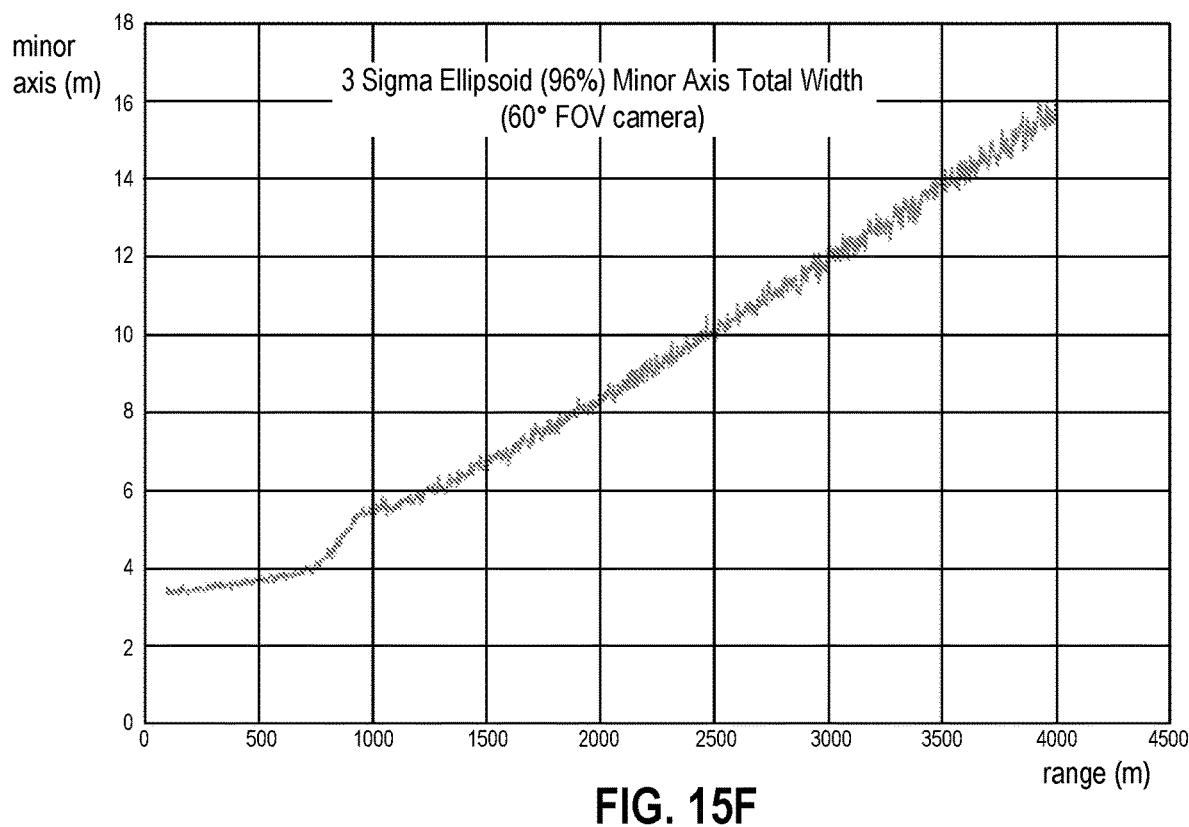

FIG. 15D is a graph showing estimated RMS error in meters, as a function of range, for 10,000 Monte Carlo simulations of a system similar to those described above. The simulations of FIG. 15D assume a system with six low-resolution cameras arranged in a circle having a radius of 750 meters, each having an imaging element with 1920 columns by 1280 rows of pixels, and each having a 60 degree FOV. The simulations further assumed a target object at an altitude of 100 meters, with the cameras mounted at altitudes of 3 meters. The simulations also assumed an error model with a 1 sigma pixel error of 2 pixels, a 1 sigma pan angle error of 0.005 degrees, and a 1 sigma tilt angle error of 0.005 degrees. During each simulation, the pixel error, pan angle error, and tilt angle error for each camera were randomly varied according to the error model. FIG. 15E is a graph of error ellipsoid major axis dimension (in meters), as a function of range, for the simulations of FIG. 15D. FIG. 15F is a graph of error ellipsoid minor axis dimension (in meters), as a function of range, for the simulations of FIG. 15D.

For the avoidance of doubt, the present application includes, but is not limited to, the subject-matter described in the following numbered clauses:

1. A method comprising determining, by one or more computing devices, a plurality of search point spatial positions in a three-dimensional search space.
2. The method of clause 1, comprising determining, based on the search point spatial positions and on orientation data for a plurality of cameras imaging at least portions of the search space, a plurality of search point image positions, wherein each of the search point image positions comprises a location in an image from a camera, of the plurality of cameras, to which a search point spatial position, of the plurality of search point spatial positions, is projected.
3. The method of any of clauses 1-2, comprising selecting, from the images in which the search point image positions are located, subimages corresponding to the search point image positions.
4. The method of any of clauses 1-3, comprising determining, from the subimages, a plurality of subimages comprising a target object image.
5. The method of any of clauses 1-4, comprising determining, based on the plurality of subimages comprising a target object image, a position of a target object in the search space.
6. The method of any of clauses 1-5, comprising outputting information indicating the position of the target object.
7. The method of any of clauses 1-6, wherein each of the subimages corresponds to a search point image position, of the plurality of search point image positions, and is less than all of the image in which the corresponding search point image position is located.
8. The method of any of clauses 1-7, comprising assigning a subset of a plurality of search points to the target object; determining, based on the position of the target object, search point spatial positions in the search space for the search points of the subset; and determining, without regard to the position of the target object, search point spatial positions in the search space for remaining search points of the plurality of search points.
9. The method of clause 8, wherein the determining search point spatial positions in the search space for the search points of the subset comprises determining positions within a predetermined distance of the position of the target object.
10. The method of any of clauses 1-9, wherein the plurality of subimages comprising a target object image is less than all of the selected subimages.
11. The method of any of clauses 1-10, wherein the plurality of cameras comprises at least six cameras and the plurality of search point spatial positions comprises at least five hundred search point spatial positions.
12. The method of any of clauses 1-11, wherein each camera, of the plurality of cameras, corresponds to a field of view (FOV), wherein at least a portion of the FOVs are smaller than the search space, and wherein each camera, of the plurality of cameras, is moving independently of the other cameras of the plurality of cameras.
13. The method of any of clauses 1-12, wherein the determining the plurality of search point spatial positions comprises, for each search point spatial position of the plurality of search point spatial positions, selecting a random location in the search space.
14. The method of any of clauses 1-13, wherein each camera, of the plurality of cameras, corresponds to a field of view (FOV), and wherein at least one of the FOVs is narrower than at least one other of the FOVs.
15. The method of any of clauses 1-14, wherein the target object comprises an unmanned aerial vehicle (UAV), and wherein the determining the plurality of subimages comprises determining that a target object image is not an image of a bird.
16. The method of any of clauses 1-15, wherein at least two cameras, of the plurality of cameras, are separated by a distance of at least 100 meters.
17. The method of any of clauses 1-16, wherein the search space covers an area of at least 10,000 square meters.
18. The method of any of clauses 1-17, comprising determining whether two subimages, of the plurality of subimages comprising a target object image, comprise target object images corresponding to a same target object.
19. An apparatus comprising one or more processors and memory storing instructions that, when executed by the one or more processors, cause the apparatus to perform the method of any of clauses 1-18.
20. A system comprising the apparatus of clause 19 and a camera configured to provide at least one of the images.
21. A non transitory computer-readable medium storing instructions that, when executed, cause performance of the method of any of clauses 1-18.
22. A method comprising determining, based on a plurality of search point spatial positions distributed throughout a three-dimensional search space, and from images from a plurality of cameras positioned to image different portions of the search space, a set of subimages corresponding to at least a portion of the search point spatial positions.
23. The method of clause 22, comprising determining, from the subimages, a plurality of subimages comprising a target object image.
24. The method of any of clauses 22-23, comprising determining whether two subimages, of the plurality of subimages comprising a target object image, comprise target object images corresponding to a same target object.
25. The method of any of clauses 22-24, comprising determining, based on the plurality of subimages comprising a target object image and on a determination of whether the two subimages comprise target object images corresponding to a same target object, positions of target objects in the search space.
26. The method of any of clauses 22-25, comprising outputting information indicating the positions of the target objects.
27. The method of any of clauses 22-26, comprising assigning, to each of the target objects, a corresponding subset of a plurality of search points; and determining, for each of the target objects, and based on the positions of the target objects, search point spatial positions in the search space for the search points of the corresponding subsets.
28. The method of any of clauses 22-27, wherein the determining search point spatial positions in the search space for the search points of the corresponding subsets comprises, for each of the subsets, determining positions within a predetermined distance of the position of the corresponding target object.
29. The method of any of clauses 22-28, wherein the plurality of subimages comprising a target object image is less than all of the set of subimages.
30. The method of any of clauses 22-29, wherein each camera, of the plurality of cameras, corresponds to a field of view (FOV), wherein at least a portion of the FOVs are smaller than the search space, and wherein each camera, of the plurality of cameras, is moving independently of the other cameras of the plurality of cameras.
31. The method of any of clauses 22-30, comprising selecting, for each search point spatial position of the plurality of search point spatial positions, a random location in the search space.
32. The method of any of clauses 22-31, wherein the target objects comprise unmanned aerial vehicles (UAVs), and wherein the determining the plurality of subimages comprises determining that a target object image is not an image of a bird.
33. An apparatus comprising one or more processors and memory storing instructions that, when executed by the one or more processors, cause the apparatus to perform the method of any of clauses 22-32.
34. A system comprising the apparatus of clause 33 and a camera configured to provide at least one of the images.
35. A non transitory computer-readable medium storing instructions that, when executed, cause performance of the method of any of clauses 22-32.
36. A method comprising determining, based on images from a plurality of cameras positioned to image portions of a search space, subimages indicating detection of an unmanned aerial vehicle (UAV) in the search space, wherein at least two cameras, of the plurality of cameras, are separated by a distance of at least 100 meters, and wherein the search space covers an area of at least 10,000 square meters.
37. The method of clause 36, comprising determining, based on the subimages indicating detection of a UAV in the search space, a position of a UAV in the search space.
38. The method of any of clauses 36-37, comprising outputting information indicating the position of the UAV.
39. The method of any of clauses 36-38, wherein each camera, of the plurality of cameras, corresponds to a field of view (FOV), wherein at least a portion of the FOVs are smaller than the search space, and wherein each camera, of the plurality of cameras, is moving independently of the other cameras of the plurality of cameras.
40. The method of any of clauses 36-39, comprising assigning a subset of a plurality of search points to the UAV; determining, based on the position of the UAV, search point spatial positions in the search space for the search points of the subset; determining, without regard to the position of the UAV, search point spatial positions in the search space for remaining search points of the plurality of search points; selecting, from additional images from the plurality of cameras and based on the plurality of search points, additional subimages; and determining, based on at least a portion of the additional subimages, a second position of the UAV in the search space.
41. The method of any of clauses 36-40, wherein the determining the subimages comprises selecting subimages based on projections, of randomly selected search point spatial positions in the search space, onto the images.
42. An apparatus comprising one or more processors and memory storing instructions that, when executed by the one or more processors, cause the apparatus to perform the method of any of clauses 36-41.
43. A system comprising the apparatus of clause 42 and a camera configured to provide at least one of the images.
44. A non transitory computer-readable medium storing instructions that, when executed, cause performance of the method of any of clauses 36-41.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:
1. A method comprising:
determining, by one or more computing devices, a plurality of search point spatial positions in a three-dimensional search space;
determining, based on the search point spatial positions and based on orientation data for a plurality of cameras imaging at least portions of the search space, a plurality of search point image positions, wherein each of the search point image positions comprises a location in an image from a camera, of the plurality of cameras, to which a search point spatial position, of the plurality of search point spatial positions, is projected;
selecting, from images in which the search point image positions are located, subimages corresponding to the search point image positions;
determining, from the subimages, a plurality of subimages comprising a target object image;
determining, based on the plurality of subimages comprising a target object image, a position of a target object in the search space;
assigning a subset of a plurality of search points to the target object;
determining, based on the position of the target object, search point spatial positions in the search space for a first set of the search points of the subset;
determining, without regard to the position of the target object, search point spatial positions in the search space for remaining search points of the plurality of search points; and
outputting information indicating a subsequent position of the target object.
2. The method of claim 1, wherein each of the subimages corresponds to a search point image position, of the plurality of search point image positions, and is less than all of the image in which the corresponding search point image position is located.
3. The method of claim 1, wherein the determining search point spatial positions in the search space for the search points of the subset comprises determining positions within a predetermined distance of the position of the target object.
4. The method of claim 1, wherein the plurality of subimages comprising a target object image is less than all of the selected subimages.
5. The method of claim 1, wherein the plurality of cameras comprises at least six cameras and the plurality of search point spatial positions comprises at least five hundred search point spatial positions.
6. The method of claim 1, wherein each camera, of the plurality of cameras, corresponds to a field of view (FOV), wherein at least a portion of the FOVs are smaller than the search space, and wherein each camera, of the plurality of cameras, is moving independently of the other cameras of the plurality of cameras.
7. The method of claim 1, wherein the determining the plurality of search point spatial positions comprises, for each search point spatial position of the plurality of search point spatial positions, selecting a random location in the search space.
8. The method of claim 1, wherein each camera, of the plurality of cameras, corresponds to a field of view (FOV), and wherein at least one of the FOVs narrower than at least one other of the FOVs.
9. The method of claim 1, wherein at least two cameras, of the plurality of cameras, are separated by a distance of at least 100 meters.
10. The method of claim 1, wherein the search space covers an area of at least 10,000 square meters.
11. The method of claim 1, further comprising:
determining whether two subimages, of the plurality of subimages comprising a target object image, comprise target object images corresponding to a same target object.
12. The method of claim 1, further comprising:
selecting, from additional images from the plurality of cameras and based on the subset of the plurality of search points, additional subimages; and
determining, based on at least a portion of the additional subimages, the subsequent position of the target object.
13. A computing device comprising:
one or more processors; and
memory storing instructions that, when executed by the one or more processors, cause the computing device to:
determine a plurality of search point spatial positions in a three-dimensional search space;
determine, based on the search point spatial positions and based on orientation data for a plurality of cameras imaging at least portions of the search space, a plurality of search point image positions, wherein each of the search point image positions comprises a location in an image from a camera, of the plurality of cameras, to which a search point spatial position, of the plurality of search point spatial positions, is projected;

select, from images in which the search point image positions are located, subimages corresponding to the search point image positions;

determine, from the subimages, a plurality of subimages comprising a target object image;

determine, based on the plurality of subimages comprising a target object image, a position of a target object in the search space;

assign a subset of a plurality of search points to the target object;

determine, based on the position of the target object, search point spatial positions in the search space for a first set of the search points of the subset;

determine, without regard to the position of the target object, search point spatial positions in the search space for remaining search points of the plurality of search points; and output information indicating a subsequent position of the target object.

14. The computing device of claim 13, wherein each of the subimages corresponds to a search point image position, of the plurality of search point image positions, and is less than all of the image in which the corresponding search point image position is located.

15. The computing device of claim 13, wherein the instructions, when executed by the one or more processors, cause the computing device to determine search point spatial positions in the search space for the search points of the subset by determining positions within a predetermined distance of the position of the target object.

16. The computing device of claim 13, wherein the plurality of subimages comprising a target object image is less than all of the selected subimages.

17. The computing device of claim 13, wherein the plurality of cameras comprises at least six cameras and the plurality of search point spatial positions comprises at least five hundred search point spatial positions.

18. The computing device of claim 13, wherein each camera, of the plurality of cameras, corresponds to a field of view (FOV), wherein at least a portion of the FOVs are smaller than the search space, and wherein each camera, of the plurality of cameras, is moving independently of the other cameras of the plurality of cameras.

19. The computing device of claim 13, wherein the instructions, when executed by the one or more processors, cause the computing device to determine the plurality of search point spatial positions by selecting, for each search point spatial position of the plurality of search point spatial positions, a random location in the search space.

20. The computing device of claim 13, wherein each camera, of the plurality of cameras, corresponds to a field of view (FOV), and wherein at least one of the FOVs narrower than at least one other of the FOVs.

21. The computing device of claim 13, wherein at least two cameras, of the plurality of cameras, are separated by a distance of at least 100 meters.

22. The computing device of claim 13, wherein the search space covers an area of at least 10,000 square meters.

23. The computing device of claim 13, wherein the instructions, when executed by the one or more processors, cause the computing device to determine whether two subimages, of the plurality of subimages comprising a target object image, comprise target object images corresponding to a same target object.

24. The computing device of claim 13, wherein the instructions, when executed by the one or more processors, cause the computing device to:

select, from additional images from the plurality of cameras and based on the subset of the plurality of search points, additional subimages; and determine, based on at least a portion of the additional subimages, the subsequent position of the target object.

25. A non-transitory computer-readable medium comprising instructions that, when executed, cause a computing device to:

determine a plurality of search point spatial positions in a three-dimensional search space;

determine, based on the search point spatial positions and based on orientation data for a plurality of cameras imaging at least portions of the search space, a plurality of search point image positions, wherein each of the search point image positions comprises a location in an image from a camera, of the plurality of cameras, to which a search point spatial position, of the plurality of search point spatial positions, is projected;

select, from images in which the search point image positions are located, subimages corresponding to the search point image positions;

determine, from the subimages, a plurality of subimages comprising a target object image;

determine, based on the plurality of subimages comprising a target object image, a position of a target object in the search space;

assign a subset of a plurality of search points to the target object;

determine, based on the position of the target object, search point spatial positions in the search space for a first set of the search points of the subset;

determine, without regard to the position of the target object, search point spatial positions in the search space for remaining search points of the plurality of search points; and output information indicating a subsequent position of the target object.

26. The non-transitory computer-readable medium of claim 25, wherein each of the subimages corresponds to a search point image position, of the plurality of search point image positions, and is less than all of the image in which the corresponding search point image position is located.

27. The non-transitory computer-readable medium of claim 25, wherein the instructions, when executed, cause the computing device to determine search point spatial positions in the search space for the search points of the subset by determining positions within a predetermined distance of the position of the target object.

28. The non-transitory computer-readable medium of claim 25, wherein the plurality of subimages comprising a target object image is less than all of the selected subimages.

29. The non-transitory computer-readable medium of claim 25, wherein the plurality of cameras comprises at least six cameras and the plurality of search point spatial positions comprises at least five hundred search point spatial positions.

30. The non-transitory computer-readable medium of claim 25, wherein each camera, of the plurality of cameras, corresponds to a field of view (FOV), wherein at least a portion of the FOVs are smaller than the search space, and wherein each camera, of the plurality of cameras, is moving independently of the other cameras of the plurality of cameras.

31. The non-transitory computer-readable medium of claim 25, wherein the instructions, when executed, cause the computing device to determine the plurality of search point spatial positions by selecting, for each search point spatial position of the plurality of search point spatial positions, a random location in the search space.

32. The non-transitory computer-readable medium of claim 25, wherein each camera, of the plurality of cameras, corresponds to a field of view (FOV), and wherein at least one of the FOVs narrower than at least one other of the FOVs.

33. The non-transitory computer-readable medium of claim 25, wherein at least two cameras, of the plurality of cameras, are separated by a distance of at least 100 meters.

34. The non-transitory computer-readable medium of claim 25, wherein the search space covers an area of at least 10,000 square meters.

35. The non-transitory computer-readable medium of claim 25, wherein the instructions, when executed, cause the computing device to determine whether two subimages, of the plurality of subimages comprising a target object image, comprise target object images corresponding to a same target object.

36. The non-transitory computer-readable medium of claim 25, wherein the instructions, when executed, cause the computing device to:
    select, from additional images from the plurality of cameras and based on the subset of the plurality of search points, additional subimages; and
    determine, based on at least a portion of the additional subimages, the subsequent position of the target object.

\* \* \* \* \*

UNITED STATES PATENT AND TRADEMARK OFFICE
CERTIFICATE OF CORRECTION

| | | |
|---|---|---|
| PATENT NO. | : 11,335,026 B1 | Page 1 of 1 |
| APPLICATION NO. | : 16/779917 | |
| DATED | : May 17, 2022 | |
| INVENTOR(S) | : Bramlett et al. | |

It is certified that error appears in the above-identified patent and that said Letters Patent is hereby corrected as shown below:

On the Title Page

Column 1, (22) Filed Line 1:
After "2020", insert --(65) Prior Publication Data US 2022/0150417 A1 May 12, 2022--

Column 2, Item (56) Other Publications Line 6:
Delete "Chapters," and insert --Chapter 3,-- therefor Page 2, Column 1, Item (56) Other Publications Line 10:
Delete "PIZ" and insert --PTZ-- therefor Signed and Sealed this
Fifteenth Day of November, 2022

*Katherine Kelly Vidal*

Katherine Kelly Vidal
*Director of the United States Patent and Trademark Office*